(12) United States Patent
Sacchetto et al.

(10) Patent No.: US 12,153,291 B2
(45) Date of Patent: Nov. 26, 2024

(54) ELECTRO-OPTIC MODULATOR

(71) Applicant: LiGenTec SA, Ecublens (CH)

(72) Inventors: Davide Sacchetto, Ecublens (CH); Michael Zervas, Ecublens (CH); Michael Geiselmann, Ecublens (CH)

(73) Assignee: LiGenTec, SA, Ecublens (CH)

( * ) Notice: Subject to any disclaimer, the term of this patent is extended or adjusted under 35 U.S.C. 154(b) by 299 days.

(21) Appl. No.: 17/640,068

(22) PCT Filed: Sep. 2, 2020

(86) PCT No.: PCT/EP2020/074410
§ 371 (c)(1),
(2) Date: Mar. 3, 2022

(87) PCT Pub. No.: WO2021/043792
PCT Pub. Date: Mar. 11, 2021

(65) Prior Publication Data
US 2022/0334449 A1 Oct. 20, 2022

(30) Foreign Application Priority Data
Sep. 3, 2019 (GB) .................................. 1912614

(51) Int. Cl.
*G02F 1/025* (2006.01)
*G02F 1/225* (2006.01)
(Continued)

(52) U.S. Cl.
CPC ............ *G02F 1/025* (2013.01); *G02F 1/2257* (2013.01); *G02F 1/0151* (2021.01); *G02F 1/212* (2021.01); *G02F 2202/10* (2013.01)

(58) Field of Classification Search
CPC ...................................................... G02F 1/025
See application file for complete search history.

(56) References Cited

U.S. PATENT DOCUMENTS 4,943,133 A * 7/1990 Deri .................. G02F 1/025
359/279
10,908,438 B1 * 2/2021 Wood ................. G02F 1/0081
(Continued)

FOREIGN PATENT DOCUMENTS

| CN | 108107608 A | * 11/2017 |
|---|---|---|
| WO | 2016018285 A1 | 2/2016 |
| WO | 2019038600 A1 | 2/2019 |

OTHER PUBLICATIONS

United Kingdom Intellectual Property Office; Combined Search and Examination Report; Application No. GB 1912614.3; Application Filing Date Sep. 3, 2019; 6 pages.

*Primary Examiner* — Michael Stahl
(74) *Attorney, Agent, or Firm* — Ryan Dean; Umberg Zipser LLP

(57) ABSTRACT

An electro-optic modulator for a waveguide is presented. The electro-optic modulator includes a first semiconductor layer, a second semiconductor layer, a dielectric layer interposed between the second semiconductor layer and the first semiconductor layer and a coupling layer for coupling a guided mode of the waveguide to at least one of the first semiconductor layer and the second semiconductor layer. The electro-optic modulator is configured to induce a modulation on the guided mode of the waveguide by changing a refractive index in response to a voltage applied between the first semiconductor layer and the second semiconductor layer.

23 Claims, 11 Drawing Sheets

(51) Int. Cl.
    *G02F 1/015*     (2006.01)
    *G02F 1/21*     (2006.01)

(56) References Cited

U.S. PATENT DOCUMENTS

| | | | |
|---|---|---|---|
| 2008/0112032 A1* | 5/2008 | Vlasov | G02F 1/011 359/248 |
| 2010/0215309 A1* | 8/2010 | Shubin | G02F 1/01708 385/2 |
| 2010/0247022 A1* | 9/2010 | Li | G02F 1/0147 385/14 |
| 2013/0101247 A1* | 4/2013 | Cho | G02F 1/025 977/734 |
| 2016/0357035 A1* | 12/2016 | Kamei | G02F 1/025 |
| 2016/0357036 A1 | 12/2016 | Shi et al. | |
| 2017/0176780 A1* | 6/2017 | Levy | G02B 6/29338 |
| 2017/0212368 A1 | 7/2017 | Liang et al. | |
| 2018/0299706 A1 | 10/2018 | Kuwabara et al. | |
| 2019/0155068 A1* | 5/2019 | Dalir | G02F 1/025 |
| 2022/0179279 A1* | 6/2022 | Amin | G02F 1/225 |

* cited by examiner

ELECTRO-OPTIC MODULATOR

TECHNICAL FIELD

This specification relates to an electro-optic modulator.

BACKGROUND

In recent years, a plethora of applications based on photonic integrated circuits (PICs) have emerged including data centre communications, coherent telecommunications, filters, supercontinuum generation, spectroscopy, biosensing, quantum optics and microwave photonics. With the increasing interest in the emerging photonic circuits, a successful photonic platform requires electro-optic modulators.

SUMMARY

According to an aspect of the present invention, there is provided an electro-optic modulator for a waveguide. The electro-optic modulator comprises a first semiconductor layer, a second semiconductor layer, a dielectric layer interposed between the second semiconductor layer and the first semiconductor layer and a coupling layer for coupling a guided mode of the waveguide to at least one of the first semiconductor layer and the second semiconductor layer. The electro-optic modulator is configured to induce a modulation on the guided mode of the waveguide by changing a refractive index in response to a voltage applied between the first semiconductor layer and the second semiconductor layer.

In some implementations, the first semiconductor layer and the second semiconductor layer comprise opposite types of doping to each other such that when the first semiconductor layer exhibits an n-type behaviour, the second semiconductor layer exhibits a p-type behaviour and when the first semiconductor layer exhibits a p-type behaviour, the second semiconductor layer exhibits an n-type behaviour.

In some implementations, at least one of the first semiconductor layer and the second semiconductor layer comprise a non-degenerate semiconductor.

In some implementations, at least one of the first semiconductor layer and the second semiconductor layer comprise a III-V semiconductor.

In some implementations, at least one of the first semiconductor layer and the second semiconductor layer comprise one or more of silicon, germanium and SiGe alloys.

In some implementations, a structure of at least one of the first semiconductor layer and the second semiconductor layer is one of the following: amorphous, hydrogenated amorphous, polycrystalline, nanocrystalline or crystalline.

In some implementations, at least one of the first semiconductor layer and the second semiconductor layer comprise an alloy including one or more of NiSi, $Ni_2Si$, $NiSi_2$, TiSi, $TiSi_2$, CoSi, $Co_2Si$, PtSi or germanide thin films.

In some implementations, at least one of the first semiconductor layer and the second semiconductor layer comprise an intrinsic semiconductor.

In some implementations, at least one of the first semiconductor layer and the second semiconductor layer comprise a semi-metallic layer.

In some implementations, a thickness of the dielectric layer is between 0.1 nm and 40 nm.

In some implementations, a thickness of the semiconductor layer and the second semiconductor layer is less than 500 nm.

In some implementations, the coupling layer comprises one or more of silicon dioxide ($SiO_2$), silicon oxynitride (SiON), aluminium oxide ($Al_2O_3$), aluminium nitride (AlN), Benzocyclobutene (BCB), poly methyl methacrylate (PMMA) or Parylene.

In some implementations, the dielectric layer comprises one or more of silicon dioxide ($SiO_2$), silicon oxynitride (SiON), Benzocyclobutene (BCB), poly methyl methacrylate (PMMA) or Parylene.

In some implementations, there is provided a device including a waveguide including a core and the electro-optic modulator described hereinbefore. A cross-section of the core is of a polygonal shape at at least one position along the propagation direction of the guided mode and at the at least one position, the electro-optic modulator is formed to be substantially parallel to and to cover a side of the cross-section of the core.

In some implementations, at the at least one position, the electro-optic modulator is formed to be substantially parallel to and to cover two or more consecutive sides of the cross-section of the core.

In some implementations, an extent of the first semiconductor layer along the propagation direction of the guided mode is larger than an extent of the dielectric layer along the same direction. The extent of the dielectric layer along the propagation direction of the guided mode is larger than an extent of the second semiconductor layer in the same direction.

In some implementations, there is provided a Mach-Zehnder modulator including an input port, an output port, a first splitter and a second splitter connected respectively to the input port and the output port and configured to split a guided mode of light received respectively from the input port and the output port into two guided modes of light, and a first arm and a second arm disposed between and connecting the first splitter and the second splitter such that a Mach-Zehnder interferometer is formed. The first arm comprises a waveguide and a first electro-optic modulator, being the electro-optic modulator described hereinbefore.

In some implementations, the second arm comprises a waveguide and a second electro-optic modulator, being the electro-optic modulator described hereinbefore.

In some implementations, there is provided a ring resonator including a bus waveguide comprising an input port and an output port, a ring resonator coupled to the bus waveguide. The ring resonator comprises a waveguide and the electro-optic modulator described hereinbefore.

According to another aspect of the present invention, there is provided a method of fabricating an electro-optic modulator on a waveguide, the method comprising: depositing a coupling layer on the waveguide; depositing a first semiconductor layer on the coupling layer; depositing a dielectric layer on the first semiconductor layer; and depositing a second semiconductor layer on the dielectric layer.

In some implementations, the depositing the coupling layer comprises one or more of PECVD, LPCVD, atomic layer deposition (ALD), thermal oxidation.

In some implementations, the depositing the first silicon layer or the second silicon layer comprises LPCVD, PECVD, ALD, sputtering or PVD techniques with a doping level less than $2 \times 10^{20}$ at/$cm^3$.

In some implementations, the depositing the dielectric layer comprises oxidation of the first semiconductor layer or one or more of atomic layer deposition (ALD), thermal oxidation or nitridation.

BRIEF DESCRIPTION OF THE DRAWINGS

Certain embodiments of the present invention will now be described, by way of examples, with reference to the accompanying drawings, in which:

FIGS. 5a and 5b are a schematic top view of a Mach-Zehnder modulator.

DETAILED DESCRIPTION

Figure 1:
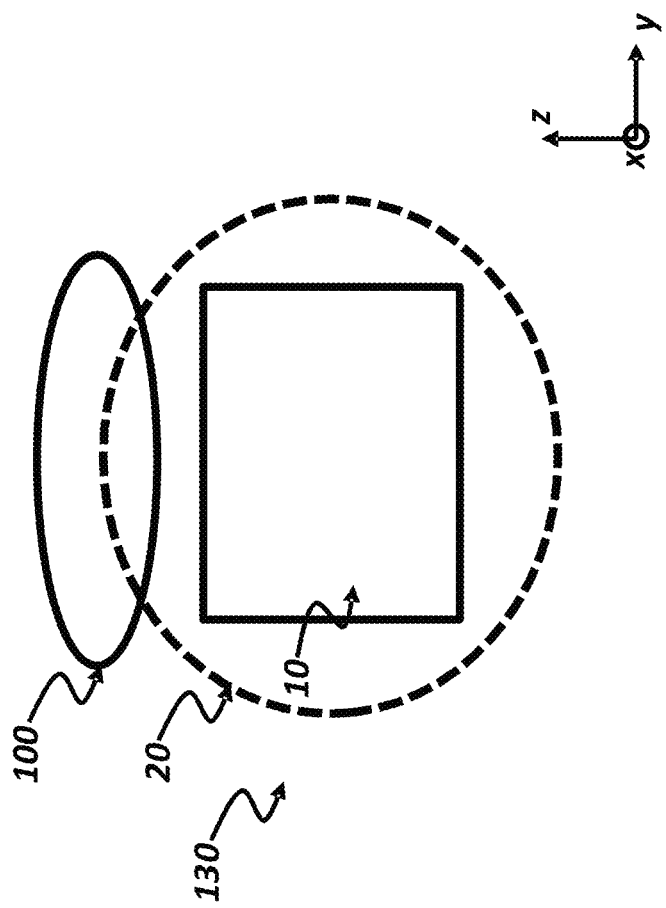
FIG. 1 is a schematic view of a cross-section of an electro-optic modulator on a waveguide.

An electro-optic modulator is an optical device in which physical properties of a beam of light or a guided mode of light are modulated in response to an electric signal. Examples of physical properties of light include phase, amplitude or polarization.

The electro-optic effect, on which the electro-optic modulator operates are based, includes the electro-refractive effect and the electro-absorptive effect.

Phase modulation of light may be achieved via the electro-refractive effect of a material, in which in response to an electric field, the real part of the refractive index of the material changes. When a light beam is passing through a material with an electro-optic property, the path length the light beam experiences changes with the strength of the electric field applied to the material. The modulation of polarization can also be achieved via the electro-refractive effect, for example, with a non-centrosymmetric material.

The amplitude modulation of light may be achieved via the electro-absorptive effect of a material, in which in response to an electric field, the imaginary part of the refractive index of the material changes. When a light beam is passing through a material with an electro-optic property, the attenuation the light beam experiences changes with the strength of the electric field applied to the material.

The electro-refractive effect and the electro-absorptive effect as described above are inherent properties of materials. State of the art electro-optic modulators operating via the electro-optic effect use materials such as PZT (Lead zirconate titanate), $BaTiO_3$ (Barium titanate), and $LiNbO_3$ (Lithium niobate).

The electro-refractive effect and the electro-absorptive effect as defined hereinbefore are known to be relatively weak in pure silicon at the communication wavelengths 1.3 μm and 1.55 μm. The modulation of light in silicon devices may be achieved via the plasma dispersion effect, in which the change in the density of charges leads to the effective changes in the real and imaginary part of the refractive index.

The charge density within silicon devices can be manipulated with an electric field via carrier injection, accumulation or depletion. Therefore, the modulation of phase and amplitude of light can be achieved with silicon devices via the plasma dispersion effect.

In this specification, the term 'electro-optic modulator' will be understood to encompass all of the mechanisms discussed hereinbefore, namely the electro-optic effect and the plasma dispersion effect, and other possible mechanisms to induce the modulation of phase, amplitude or polarization of light in response to an electric field. Therefore, the term "electro-optic modulator" in this specification is used to mean any optical device in which a beam of light or a guided mode of light are modulated in response to an electric signal.

Lithium niobate modulators have been, for a while, the gold standard for modulators in terms of electrical bandwidth and extinction ratio, even if they suffer from several limiting factors such as large footprints and insertion losses of several dBs. In the past few years, various electro-optic modulators in an integrated form have been demonstrated using different materials, such as in Si, InP and thin-film $LiNbO_3$, and have proven to be appealing for high symbol rate modulation. Although all these integrated concepts offer a wide modulation bandwidth larger than 20 GHz, they suffer from different drawbacks, such as complex fabrication processes (3D Si doping), large propagation losses (InP-on-Si, 16 dB/cm), or from large foot-print (larger than 3 mm across), hindering the integration with other photonic components. Integration of light sources with these modulators can be realized by means of hybrid integration, for example, by integrating a III-V light source with a SOI chip or by monolithic integration but all the explored solutions have faced industrial challenges.

One solution to address these issues is to use a Fabry-Perot etalon to minimize the size of the device, and thus enhancing the maximum operating speed. This solution however has been obtained by engineering multiple quantum well structures in III-V materials, which requires expensive processing for the fabrication of such devices with the required quality. In addition, the structure cannot be laterally integrated, which is a further limitation that impedes its implementation for on-chip photonics.

As an alternative solution to the above includes a solution based on carrier injection, namely to form a p/n junction around a Si waveguide such that a local modulation of the complex index of refraction is obtained by electrically biasing said p/n junction. Another solution exploiting carrier depletion in p-i-n junctions has been proposed and demonstrated in literature. Unfortunately, such approaches are prone to large optical losses in Si on the order of 3 dB/cm at 1550 nm, high electrical RF losses due to the large currents flow, considerable heat dissipation and large footprint.

This specification relates to an electro-optic modulator which may address some of these issues.

FIG. 1 is a schematic that illustrates an exemplary embodiment of an electro-optic modulator 100.

FIG. 1 shows a cross-section view of a waveguide including a core 10 and the electro-optic modulator, or the EO modulator, 100. The core 10 and the EO modulator 100 are embedded within or at least in contact with a surrounding material 130.

The waveguide may be formed by the core 10 and a cladding, where at least part of the cladding may be formed by the surrounding material 130.

The core 10 has a different refractive index than the surrounding material 130 such that it supports a guided mode 20. Equivalently, the region around the centre of the guided mode 20 with a different refractive index than the surrounding material 130 may be regarded as the core 10. The shape of the cross-section the core 10 in the yz-plane is shown to be a square shape in the example of FIG. 1. However, the shape of the cross-section of the core 10 is not limited to a square shape. In some implementations, the shape of the cross-section of the core 10 may be of a polygonal shape.

The guided mode 20 may reside in the core 10 and the cladding. In some implementations, one or more surface of the core 10 may be in contact with the cladding. In some implementations, the core 10 may be wholly embedded within a cladding. As long as the core 10 supports the guided mode 20 to propagate along the core 10, the configuration of the waveguide is not limited to these examples.

In some implementations, the surrounding material 130 around the core 10 forming the cladding of the waveguide may be uniform throughout the transverse profile of the mode 20.

In some implementations, the surrounding material 130 around the core 10 forming the cladding of the waveguide may include one or more further interfaces at which the refractive index changes such that the transverse profile of the guided mode 20 may extend beyond that one or more interfaces within the surrounding material 130.

In some implementations, the core 10 may be embedded in the surrounding material 130 without any of the surfaces exposed to air or vacuum.

In some implementations, at least one surface of the core 10 may be exposed to air or vacuum. For example, for a rib waveguide formed with the core 10, at least one surface is completely exposed to air or vacuum without being covered with the surrounding material 130. In this case, the cladding may be formed by the surrounding material 130 in contact with the core 10 and the space around the exposed part of the core 10, which may be air or vacuum.

The guided mode 20 travels in the x-direction, namely in a perpendicular direction to the cross section of the core 10, guided by the waveguide formed by the core 10 and the cladding material around the core formed within the surrounding material 130.

The transverse mode profile, namely the power or intensity distribution of the guided mode 20 in the yz-plane, parallel to the cross section of the core 10, resides substantially within the cross-section of the core 10 but extends beyond the boundary defined by the cross-section of the core 10 in the yz-plane.

In some implementations, the transverse mode profile of the guided mode 20 may have the highest intensity in the centre of the core 10. In some implementations, the centre of the core 10 and the centre of the guided mode 20 may coincide and have the highest intensity within the transverse mode profile of the guided mode 20 in the yz-plane.

The overall shape of the guided mode 20 is illustrated with a dotted line as shown in FIG. 1. The dotted line depicting the guided mode 20 in FIG. 1 is a visual guide only to illustrate the approximate extent of the guided mode 20. For example, the dotted line 20 may represent a line following the same intensity, such as $1/e^2$ of the peak intensity at the centre of the guided mode 20 for the surrounding material 130 with a uniform refractive index around the core 10. As shown in the dotted line representing the guided mode 20 in FIG. 1, at least a fraction of the power of the guided mode 20 may reside outside the core 10.

In some implementations, the fraction of power residing outside the core 10 may comprise an evanescent field on the surface of the core.

The EO modulator 100 is configured to induce attenuation and/or phase shift on the guided mode 20. This is achieved by the change of the refractive index induced in the EO modulator 100 in response to an electric field applied to the EO modulator.

In some implementations, the EO modulator 100 is configured to induce a phase shift on the guided mode 20. This is achieved by the change of the real part of the refractive index induced in the EO modulator 100 in response to an electric field applied to the EO modulator.

In some implementations, the EO modulator 100 is configured to induce attenuation on the guided mode 20. This is achieved by the change of the imaginary part of the refractive index induced in the EO modulator 100 in response to an electric field applied to the EO modulator.

In some implementations, the EO modulator 100 may be positioned away from the centre of the guided mode 20.

In some implementations, the EO modulator 100 may be placed outside the core 10 in case the core 10 has a different refractive index compared to the surrounding material 130.

In some implementations, when the core 10 does not exhibit a step-like refractive index change with respect to the surrounding material 130 and the refractive index changes gradually towards the centre of the guided mode 20 such that the boundary of the core 10 is not clearly defined in the yz-plane parallel to the cross-section of the core 10, the EO modulator 100 may be placed such that the extent of the EO modulator 100 does not overlap the centre of the guided mode 20. In this case, as will be discussed later, the position of the EO modulator 100 may be determined to provide a balance between the depth of modulation and the degree of loss.

Also in the later examples, although the core 10 and the surrounding material may be shown to have a definite boundary for explaining the concept, in practice, the change of the refractive index at these boundaries may not be stepwise and be gradual varying around the interface. It is understood that also in these cases the EO modulator 100 may be placed such that the extent of the EO modulator 100 does not overlap the centre of the guided mode 20.

The balance between the depth of modulation and the degree of loss may be specific to each application. In other words, the depth of modulation and the degree of loss may be determined for each application. For example, a tolerable degree of loss may be specified for a certain application. Then the position of the EO modulator 100 may be determined to maximise the operation bandwidth within the specified tolerable optical loss.

In some implementations, the waveguide may be designed such that the modification of the effective refractive index of the waveguide by the EO modulator 100 is taken into consideration. For example, the transverse extent of the guided mode 20 with respect to the position and the material composition of the EO modulator 100 may be determined a priori at the design stage.

In some implementations, the EO modulator 100 may be disposed within the cladding forming part of the surrounding material 130 which embeds the core 10.

In some implementations, the EO modulator 100 may be disposed outside an interface formed within the surrounding material 130 but close enough to the core 10 to induce phase modulation of the guided mode 20. For example, an interface formed within the surrounding material 130 may support an evanescent field as part of the guided mode 20 and the EO modulator 100 may be positioned such that the EO modulator 100 interacts with the evanescent field of the guided mode 20. For another example, the guided mode 20 may extend beyond an interface formed within the surrounding material 130. The fraction of power of the guided mode 20 beyond that interface may be significant enough such that the EO modulator 100 positioned beyond that interface can impart phase modulation or amplitude modulation to the guided mode 20.

In some implementations, the refractive index of the material forming the EO modulator 100 may be different from the refractive index of the surrounding material 130 with which the EO modulator 100 is in direct contact. This may be the case irrespective of the voltage or the electric field applied to the EO modulator 100. In other words, within the operation range of the voltage of the EO modulator 100, the refractive index of the EO modulator 100 may be different from the refractive index of the surrounding material 130.

When the refractive index of the material forming the EO modulator 100 is different from the index of the surrounding material 130 in contact, the guided mode 20 may be scattered due to this index mismatch, which leads to attenuation of the guided mode 20.

When the refractive index of the material forming the EO modulator 100 has a imaginary part at the operating wavelength, the inherent dissipation or absorption of the EO modulator 100 leads to the attenuation of the guided mode 20.

As the EO modulator 100 is disposed closer to the core 10 or the centre of the guided mode 20, the degree of scattering or attenuation will be larger and loss is higher because the EO modulator 100 is placed in a position of higher intensity within the transverse mode profile of the guided mode 20. However, the degree of modulation per applied voltage or the modulation depth is also higher because the EO modulator may be placed in a position of higher intensity within the transverse mode profile of the guided mode 20.

At a given position of the EO modulator 100 and a given area in the yz-plane of the EO modulator 100, both the modulation depth and the degree of scattering or attenuation, therefore loss, are proportional to the extent of the EO modulator 100 along the length of the waveguide, namely in x-direction.

A balance between loss, due to scattering or absorption, and the modulation depth can be found by adjusting one or more of the following parameters: the position of the EO modulator 100 with respect to the guided mode 20 in the transverse yz-plane parallel to the cross-section of the core 10, the extent of the EO modulator 100 in x-direction perpendicular to the cross-section of the core 10, the volume of the material used for the EO modulator 100, the shape of the cross-section of the EO modulator 100 in the transverse yz-plane, and the refractive index of the material used for the EO modulator 100.

In some implementations, the loss due to scattering or absorption may be reduced by reducing the volume of the material used for the EO modulator 100, such as silicon or any electro-optic material. For example, if the EO modulator 100 is in the form of a thin film, the thickness of the film may be rendered as thin as possible as long as the efficiency of modulation is maintained. This aspect will be discussed in more detail in FIG. 2.

In some implementations, the loss due to scattering may be reduced by choosing the material used for the EO modulator 100 with a refractive index closer to the refractive index of the surrounding material 130 at an operating wavelength.

The parameters to adjust for the balance between the loss and the depth of modulation are not limited to these. The balance between the loss and the depth of modulation may be determined for a desired operation based on the design parameters such as required depth of modulation or specification on the degree of loss per length.

Since modulation is more efficient if the EO modulator 100 is located closer to the centre of the guided mode 20, in some examples of the prior art, the material of the core 10 itself is made with a material with an electro-optic effect, such as lithium niobate such that index modulation occurs in the middle of the mode and throughout the majority of the transverse area of the mode. In some other examples of prior art, the electro-optic modulator is arranged with silicon waveguides such that the plasma dispersion effect, or the change in the concentration of charge is induced in the middle of a guided mode or within the core of the silicon waveguide. However, in these cases, the design of the electro-optic modulator may have to be specific to the material of the waveguide.

The concept of the embodiment shown in FIG. 1 may be applied to a core 10 of the waveguide constructed with any material as long as the fabrication of the EO modulator 100 is compatible with the surrounding material 130. For example, the material of core 10 can be a centrosymmetric material with a negligible electro-optic effect or a material where the generation of plasma-dispersion is not feasible. The choice of the material of the core 10 of the waveguide may not have to relate to the electro-optic capability or modulation capability of the EO modulator 100. For example, the core 10 of the waveguide may be constructed with $Si_3N_4$ (silicon nitride).

Silicon nitride does not exhibit any appreciable electro-optic effect and does not accommodate the generation of plasma-dispersion. However, the silicon nitride as the core 10 may allow for a low-loss propagation of the guided mode 20.

In the rest of the specification, the concept will be further described by way of examples comprising a waveguide with a $Si_3N_4$ (silicon nitride) as the core 10 and a capacitor structure made with semiconductor layers as the EO modulator 100.

Figure 2A:
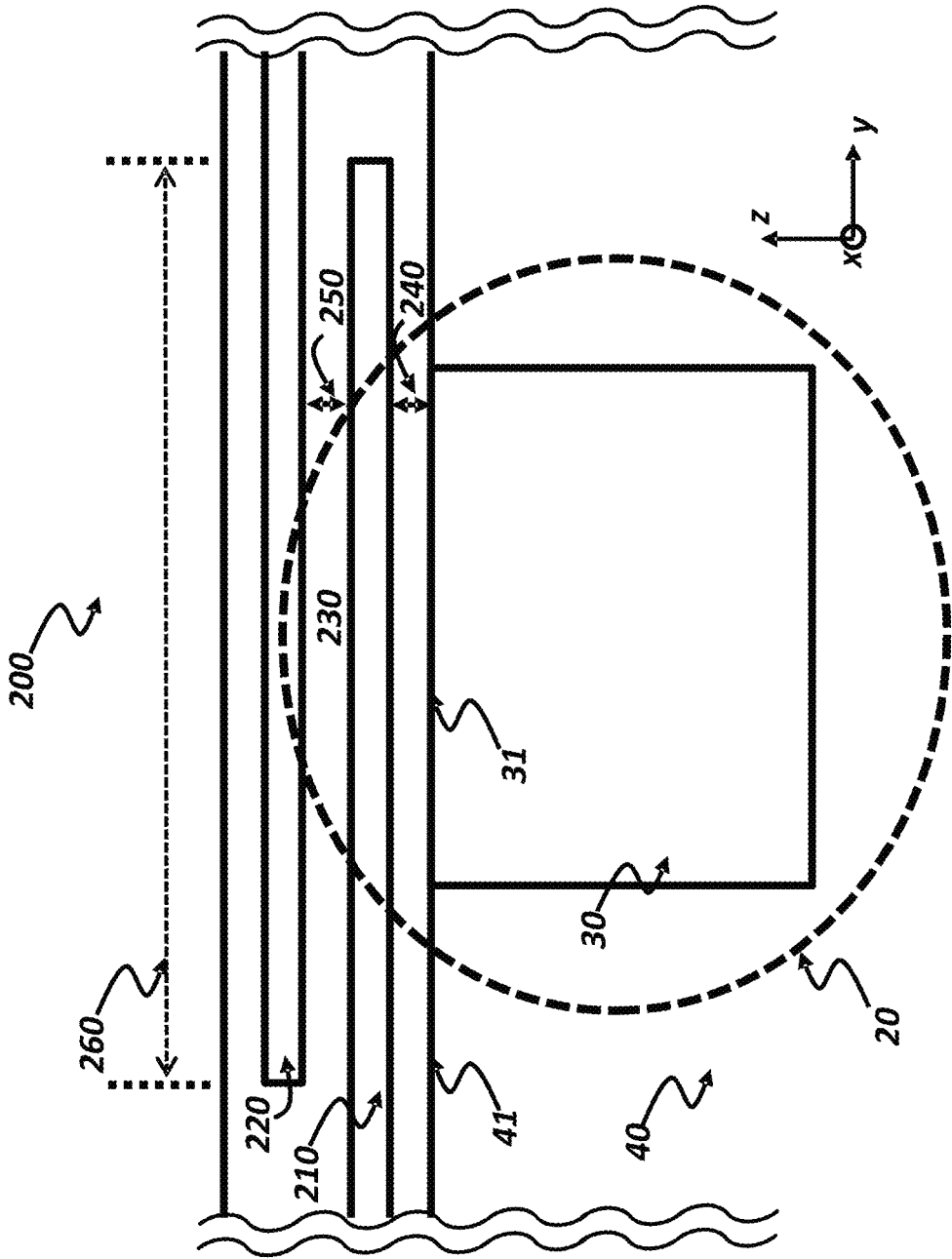
FIG. 2a is a schematic view of a cross-section of an electro-optic modulator on a waveguide.

FIG. 2a is a schematic that illustrates an exemplary embodiment of an electro-optic modulator with references to FIG. 1.

The electro-optic modulator 200, or EO modulator 200 is positioned in the vicinity of a waveguide including a core 30 embedded in a surrounding material 40. The refractive index of the surrounding material 40 is lower than the refractive index of the core 30. In particular, the EO modulator 200 is positioned such that amplitude modulation and/or phase modulation can be imparted on the guided mode 20 supported by the waveguide.

In the example of FIG. 2a, the cross-section of the core 30 has a rectangular form and is positioned near an interface 41 formed by the end surface of the surrounding material 40. The core 30 is embedded in the surrounding material 40 such that three sides of the cross-section of the core 30 is embedded within the surrounding material 40 and one of the sides of the cross-section of the core 30, a first side 31, is parallel to or flush with the interface 41 of the surrounding material 40. Therefore, the interfaces formed by the surrounding material 40 and the first side 31 of the core 30 form one planar surface in the x-y plane. The transverse profile of the guided mode 20 of the waveguide therefore may extend beyond the plane formed by the first side 31 and the interface 41 in the positive z-direction.

The thickness of the core 30, in z-direction, perpendicular to the interface 41 and the first side 31, may be between 10 nm and 2.5 µm. The examples of the material of the core 30 may include silicon nitride ($Si_xN_y$) with different stoichiometry and hydrogenated silicon nitride. The core 30 may be deposited using one or more of PECVD, sputtering or LPCVD techniques.

The examples of the material of the surrounding material 40 include one or more of silicon dioxide ($SiO_2$), silicon oxynitride (SiON) or aluminium oxide ($Al_2O_3$). The surrounding material 40 may be deposited using one or more of PECVD, LPCVD or via the thermal oxidation of a silicon substrate.

A guided mode 20 travels in the x-direction, perpendicular to the cross section of the core 30, guided by the waveguide formed by the core 30 and the surrounding material 40.

The EO modulator 200 includes a first semiconductor layer 210, a second semiconductor layer 220 and a dielectric layer 230 in between the semiconductor layer 210 and the second semiconductor layer 220. The first semiconductor layer 210 is positioned closer to the core 30 than the second semiconductor layer 220.

In some implementations, the first semiconductor layer 210 may be a silicon layer.

In some implementations, the second semiconductor layer 220 may be a silicon layer.

In some implementations, the second semiconductor layer 220 may comprise a germanium layer.

In some implementations, the second semiconductor layer 220 may comprise a graphene layer.

In some implementations, the first semiconductor layer 210 may be deposited with LPCVD, PECVD, sputtering, PVD or ALD techniques with doping levels less than $2\times10^{20}$ at/$cm^3$.

In some implementations, the second semiconductor layer 220 may be deposited with LPCVD, PECVD, MOCVD, MBE, evaporation, sputtering or ALD techniques with doping levels less than $2\times10^{20}$ at/$cm^3$.

In some implementations, the second semiconductor layer 220 may be low-doped p-type polycrystalline germanium or low-doped n-type silicon, which behave as non-degenerate semiconductors. When the first semiconductor layer 210 is n-type silicon, the second semiconductor layer 220 may be low-doped, non-degenerate p-type polysilicon or polycrystalline germanium. When the first semiconductor layer 210 is p-type silicon, the second semiconductor layer 220 may be low-doped n-type polysilicon. By heavily-doping and low-doping a semiconductor layer, the semiconductor layer is rendered to be degenerate and non-degenerate silicon layers, respectively. Non-degenerate semiconductor layer does not produce "free-charge bands" at the conduction or at the valence band of a semiconductor. These free charges are responsible for the metallic behaviour and optical losses.

In particular, when a highly doped or a metal-semiconductor alloy layer is regarded as metallic, the EO modulator 200 may correspond to a conventionally defined MOS capacitor. The MOS capacitor typically comprises a capacitor-like structure including a layer which behaves as a metal, which exhibits no appreciable band gap and a semiconductor material which exhibits a finite band gap. The MOS capacitor allows for bending of the band structure, which leads to charge inversion and accumulation.

In some implementations, the second semiconductor layer 220 comprises a degenerate semiconductor layer. The use of degenerate semiconductor layer may alleviate issues which may arise from using metallic layer as the second semiconductor layer, such as losses at the interface due to plasmonic effects.

In some other implementations, the second semiconductor layer 220 comprises a semi-metallic layer or 2D material, which is a single layer material with a 2D-like electronic behaviour with high carrier mobility, such as graphene or silicene. These semi-metallic layer may comprise group IV elements. The use of such a semi-metallic layer for the second semiconductor layer 220 may alleviate issues which may arise from using metallic layers as the second semiconductive layer 220, such as losses at the interface due to thickness.

In some implementations, when the first semiconductor layer 210 is a silicon layer and the second semiconductor layer 220 is a silicon layer, the first semiconductor layer 210 and the second semiconductor layer 220 are doped with opposite type of doping. For example, when the second semiconductor layer 220 is p-doped, the first semiconductor layer 210 is n-doped, and vice versa.

In some implementations, when the first semiconductor layer 210 is a silicon layer and the second semiconductor layer 220 is a germanium layer, the first semiconductor layer 210 and the second semiconductor layer 220 may be both non-degenerate semiconductive layers.

In some implementations, the first semiconductor layer 210 and the second semiconductor layer 220 comprise a group IV semiconductor.

In some implementations, when the first semiconductor layer 210 and the second semiconductor layer 220 comprise a group IV semiconductor and when the first semiconductor layer 210 and the second semiconductor layer 220 are doped with opposite type of doping, doping level may be such that the first semiconductor layer 210 and the second semiconductor layer 220 are non-degenerate semiconductors. For example, the level of concentration to be non-degenerate may be around 1019, although it depends on the exact dopant species and on the microstructure of the semiconductor (e.g. single crystal, poly-crystalline, amorphous) and on the material of the semiconductor (e.g. Si, Ge or III-V structures).

In some implementations, when the first semiconductor layer 210 or the second semiconductor layer 220 are intrinsic semiconductor layers, the resistivity and the Schottky barrier height of one or more of the first semiconductor layer 210 or the second semiconductor layer 220 to electrical contacts may be adjusted by alloying with transition metals, forming NiSi, $Ni_2Si$, $NiSi_2$, TiSi, $TiSi_2$, CoSi, $Co_2Si$, PtSi, $Ni_5Ge_3$, NiGe or other transition metal-group IV semiconductor thin film portions.

In some implementations, the material for the first semiconductor layer 210 and the second semiconductor layer 220, may be group IV semiconductors such as amorphous Si, hydrogenated amorphous silicon, polycrystalline silicon or crystalline silicon.

In some implementations, the material for the first semiconductor layer 210 and the second semiconductor layer 220 may be group IV semiconductors such as Germanium and SiGe alloys.

In some implementations, the material for the semiconductor layer 210 and the second semiconductor layer 220 may be III-V semiconductors such as GaAs, AlGaAs, InGaP.

In some implementations, the thickness, in z-direction, perpendicular to the interface 41 and the first side 31, of the semiconductor layer 210 and the second semiconductor layer 220 may be between 5 nm to 100 nm.

In some implementations, one or both of the semiconductor layer 210 and the second semiconductor layer 220, when they comprise a group IV semiconductor, may be treated with thermal recrystallisation techniques.

A first distance 240 is defined to be a distance between the first side 31 of the core 30 and one of the two surfaces of the first semiconductor layer 210 which is closer to the core 30. The first distance 240 represents the size of the gap formed between the semiconductor layer 210 and the core 30.

The first distance 240 may be smaller than 500 nm.

The gap between the first semiconductor layer 210 and the core 30 may be filled with one or more of silicon dioxide ($SiO_2$), silicon oxynitride (SiON), aluminium oxide ($Al_2O_3$), or aluminium nitride (AlN). The layer forming the gap between the first semiconductor layer 210 and the core 30 may be deposited using one or more of PECVD, LPCVD, atomic layer deposition (ALD) or by thermal oxidation of silicon or aluminium substrate, or by nitridation of silicon or aluminium substrate.

By controlling the first distance 240, the position of the EO modulator 200 with respect to the guided mode 20 and with the core 30 may be determined. Therefore, the first distance 240 is one of the parameters that relate to the balance between the loss and the depth of modulation. The layer providing the first distance 240 will be called a coupling layer in the later examples.

A second distance 250 is defined to be a distance between the semiconductor layer 210 and the second semiconductor layer 220. The second distance 250 is the distance between one of the two surfaces of the first semiconductor layer 210 which is further from the core 30 and one of the two surfaces of the second semiconductor layer 220 closer to the core 30. The second distance 250 represents the size of the gap formed between the silicon layer 210 and the second semiconductor layer 220. The second distance 250 corresponds to the thickness of the dielectric layer 230 forming part of the EO modulator 200.

The second distance may be between 1 nm and 30 nm.

In some implementation, the gap between the first semiconductor layer 210 and the second semiconductor layer 220 may comprise one or more of silicon dioxide ($SiO_2$), silicon oxynitride (SiON). The gap between the first semiconductor layer 210 and the second semiconductor layer 220 may be deposited by oxidation of silicon substrate or by atomic layer deposition (ALD).

In some implementations, the gap between the first semiconductor layer 210 and the second semiconductor layer 220, or the gap between the core 30 and the semiconductor layer 210 may comprise one or more of Benzocyclobutene (BCB), poly methyl methacrylate (PMMA) or parylene, in case the waveguide and the EO modulator 200 can be fabricated within below 350° C.

The first semiconductor layer 210 and the second semiconductor layer 220 are respectively connected to electrical contacts. In some implementations, one or both of the respective electrical contacts may form Shottky junctions. In some implementations, the position of the electrical contacts may be positioned further than 1 μm from the closest surface of the core 30 in the x- or y-direction such that optical loss is reduced due to these electrical contacts scattering the guided mode 20.

In some implementations, the electrical contacts comprise an alloy and the composition of the alloyed contact is such that its refractive index is lower than the refractive index of the core 30, thereby allowing the electrical contacts to be positioned closer than 1.5 μm from the closest surface of the core 30 in the x- or y-direction while minimising optical losses.

The first semiconductor layer 210, the second semiconductor layer 220 and the dielectric layer 230 form a capacitor structure in which the silicon layer 210 and the second semiconductor layer 220 are separated by the dielectric layer 230.

In some implementations, the refractive index of the semiconductor layer 210 may change when an electric field is applied via the two electrical contacts made with the first semiconductor layer 210 and the second semiconductor layer 220. For example, the carrier may accumulate in the first semiconductor layer 210 near the dielectric layer 230.

Alternatively, in some implementations, the first semiconductor layer 210 may comprise an ultrathin silicon layer such that when an electric field is applied via the two electrical contacts made with the semiconductor layer 210 and the second semiconductor layer 220, the carrier may accumulate near the dielectric layer 230 such that the semiconductor layer is fully depleted or fully accumulated. In some implementations, the refractive index of both the first semiconductor layer 210 and the second semiconductor layer 220 may change when an electric field is applied via the two electrical contacts made with the semiconductor layer 210 and the second semiconductor layer 220.

In some implementations, the refractive index of the second semiconductor layer 220 may change when an electric field is applied via the two electrical contacts made with the semiconductor layer 210 and the second semiconductor layer 220.

An overlap length 260 is defined to be the lateral width in y-direction, over which the semiconductor layer 210 and the second semiconductor layer 220 overlap to form the capacitor structure.

For example, as shown in FIG. 2a, the first semiconductor layer 210 may extend in the negative y-direction and the second semiconductor layer 220 may extend in the positive y-direction to allow electrical contacts to be formed with a sufficient distance from the core 30. The first semiconductor layer 210 and the second semiconductor layer 220 may be arranged to overlap, when viewed down into the xy-plane, directly over the core 30 above the first side 31. This is such that as discussed hereinbefore, the EO modulator 200 interacts with the guided mode 20 extending beyond the first side 31 of the core.

In FIG. 2a, the transverse mode of the guided mode 20 is represented as a dotted line. As discussed above, this line is merely a guide to the eye indicating that at least part of the power of the guided mode 20 resides outside the core 30 and above the first side 31 such that it couples at least to the first semiconductor layer 210.

In the example of FIG. 2a, the first semiconductor layer 210 and the second semiconductor layer 220 are embedded in the same material as the dielectric layer 230. The gap between the core 30 and the first semiconductor layer 210 and the gap between the first semiconductor layer 210 and the second semiconductor layer 220 are filled with the material for the dielectric layer 230. The second semiconductor layer 220 is covered with the material for the dielectric layer 230 such that neither the first semiconductor layer 210 nor the second semiconductor layer 220 are exposed to air or vacuum.

Figure 2B:
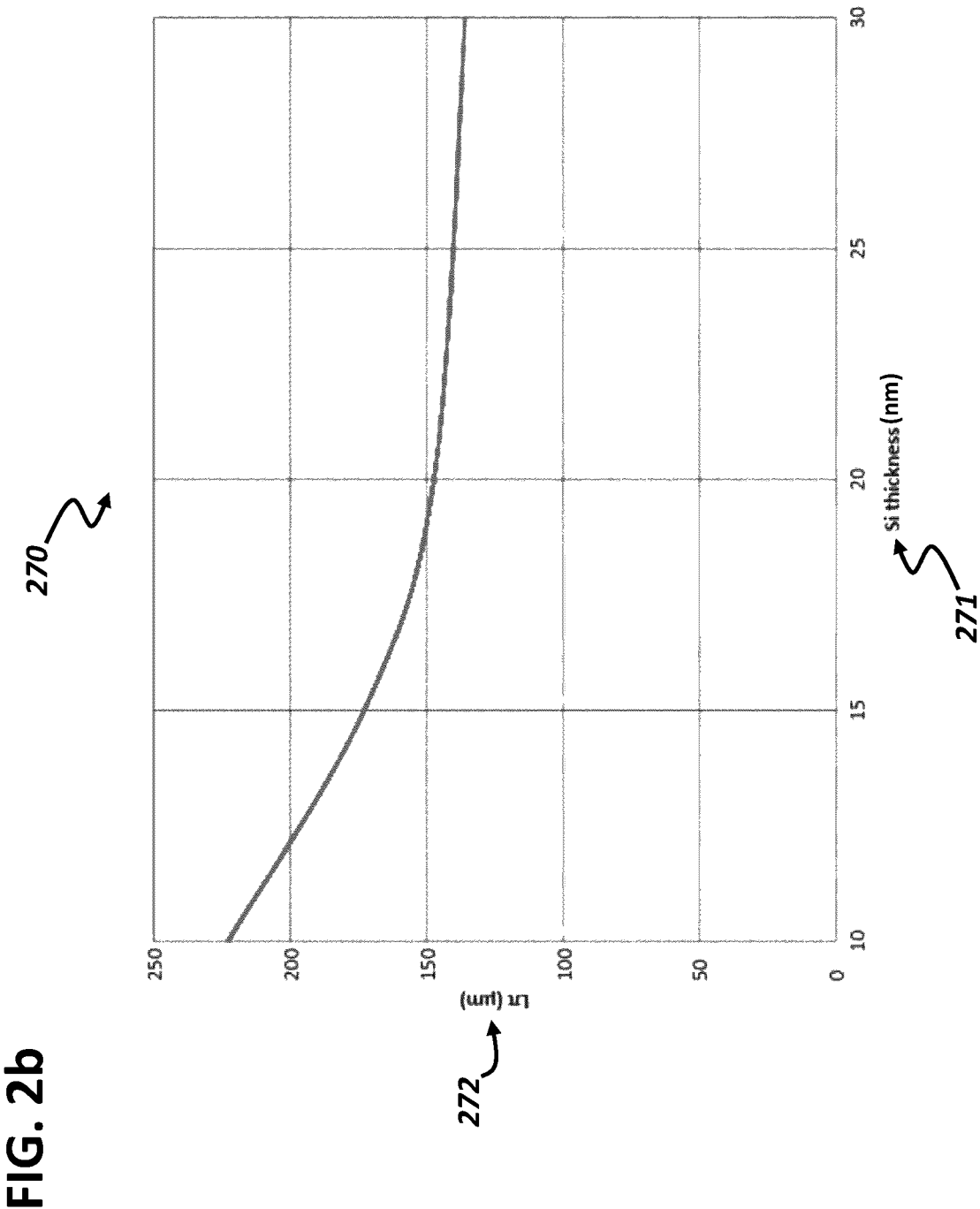
FIGS. 2b and 2c are graphs that represent the results of a numerical simulation of an electro-optic modulator.
Figure 2C:
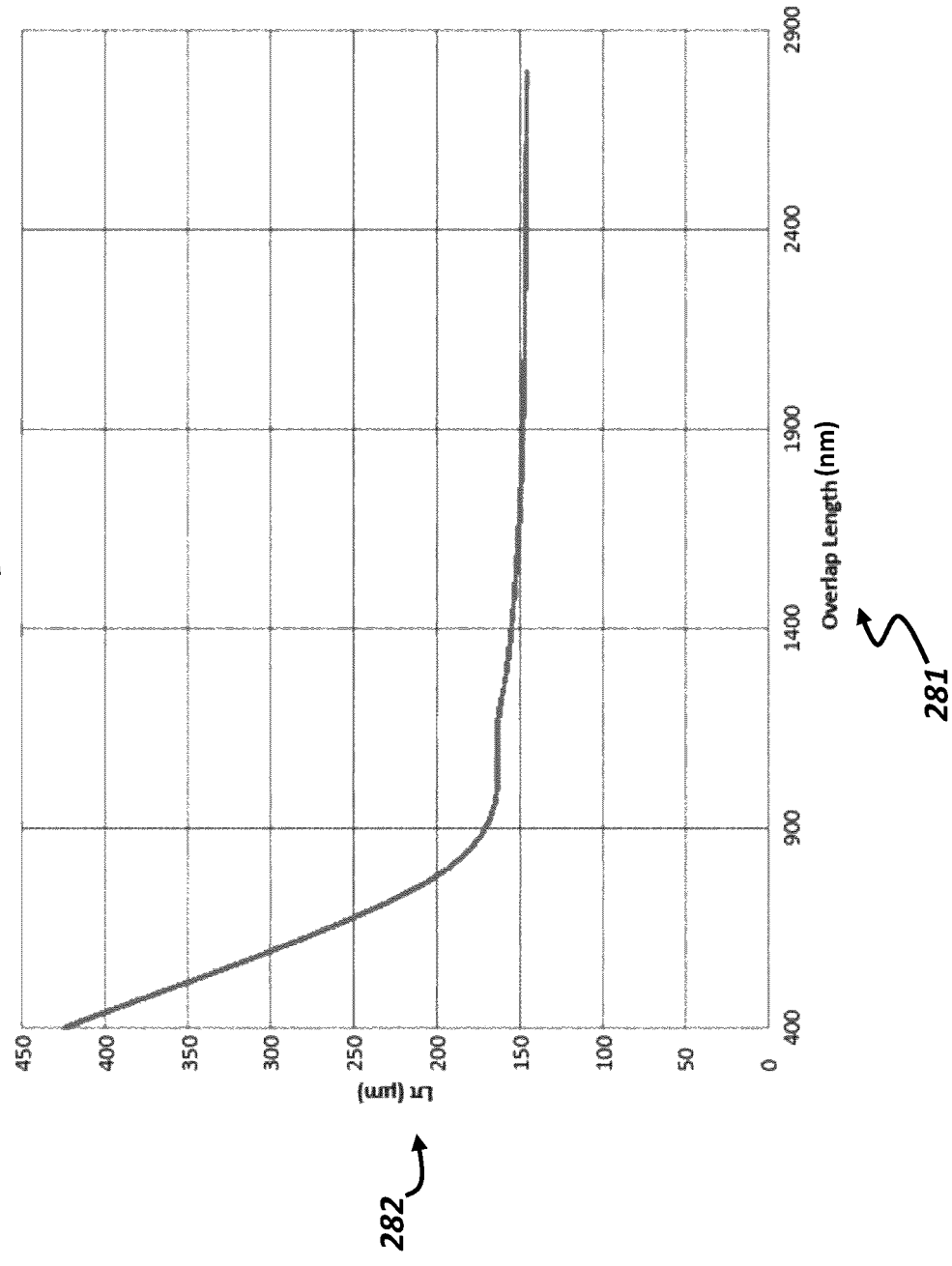

FIGS. 2b and 2c show graphs representing the results of a numerical simulation with references to FIGS. 1 and 2a.

A numerical simulation was performed for the configuration of the EO modulator 200 shown in the example in FIG. 2a. The following parameters were fixed for performing the simulation: the material of the dielectric layer 230 was set to be silicon dioxide. The width of the core 30 in y-direction was set to be 800 nm and the thickness of the core in z-direction was set to be 150 nm. The first distance 240 was set to be 5 nm, and the second distance 250 was set to be 2.5 nm. The wavelength of the simulation was at 1.55 µm. The first distance 240 and the second distance 250 may be determined by the minimum thickness of the layer which can be fabricated reliably and reproducibly during the manufacturing process.

FIG. 2b shows a graph 270 that presents the simulation result of evaluating $L_\pi$ as the thickness of the first semiconductor layer 210 and the second semiconductor layer 220 are varied. $L_\pi$ is defined to be a length of the EO modulator, in x-direction along the core 30, required to achieve a phase shift of $\pi$ when the voltage applied to the EO modulator 200 is 1V.

The graph 270 shows $L_\pi$, in the y-axis 272 as a function of the thickness in the x-axis 271. In this simulation, the overlap length 260 was set to be 2 µm, wider than the width of the core 30, 800 nm. It was assumed that both the semiconductor layer 210 and the second semiconductor layer 220 were silicon layers and the thickness of these layers have been varied simultaneously from 10 nm to 30 nm.

The graph 270 shows that $L_\pi$ decreases rapidly as the thickness increases from 10 nm to 20 nm. From 20 nm to 30 nm the decrease of $L_\pi$ is not as rapid. As the thickness of the first semiconductor layer 210 and the second semiconductor layer 220 increases, the more power of the guided mode 20 interacts with the EO modulator 200, the less length of the EO modulator 200 is required to achieve the same degree of phase shift. In other words, the effective refractive index change per applied voltage increases as the thickness of the first semiconductor layer 210 and the second semiconductor layer 220 to produce the same degree of phase shift.

As the thickness increases, the loss due to scattering or absorption also increases. The loss was also evaluated from the simulation and the loss increased more or less linearly from 3.1 dB to 3.6 dB from 10 nm to 30 nm thickness. This suggests that at this position of the EO modulator 200 defined by the first distance 240, and within this range of thickness, the loss is proportional to the volume of the material of the EO modulator 200.

The capacitance of the EO modulator 200, which relates to the bandwidth of the operation, was also evaluated from the simulation. The capacitance did not vary with the thickness and was largely dependent on the length of the device and varied from 8000 fF to 13000 fF for 220 µm to 130 µm length of the EO modulator 200, respectively.

Therefore, according to the graph 270, for the given geometry of the waveguide, the thickness of the first semiconductor layer 210 and the second semiconductor layer 220 may be chosen to be around 20 nm thickness such that an optimum operation may be obtained considering the modulation depth and the loss.

FIG. 2c shows a graph 280 that presents the simulation result of evaluating $L_\pi$ as the overlap length 260 of the first semiconductor layer 210 and the second semiconductor layer 220 is varied.

The graph 280 shows $L_\pi$ in the y-axis 282 as a function of the overlap length 260 in the x-axis 281. In this simulation, it was assumed that the first semiconductor layer 210 and the second semiconductor layer 220 were silicon layers and their thickness is 20 nm. The overlap length 260 was varied from 400 nm to 2800 nm.

The graph 280 shows that $L_\pi$ decreases rapidly as the overlap length 260 increases up to about 800 nm. As the overlap length 260 increases further, the decrease of $L_\pi$ is not as rapid.

When the lateral extent, in y-axis, of the capacitor formed by the first semiconductor layer 210 and the second semiconductor layer 220 is smaller than the width of the core 30, 800 nm, the efficiency of modulation decreases, therefore the total length of the EO modulator 200 may be made longer to achieve the same degree of phase modulation.

In this specific configuration and dimensions of the EO modulator 200 simulated under FIG. 2c, when the lateral extent, in y-axis, of the capacitor formed by the first semiconductor layer 210 and the second semiconductor layer 220 exceeds the width of the core 30, it may not significantly increase the degree of modulation. This may be attributed to the fact that the guided mode 20 of the core 30 may be largely confined around the cross-section of the core 30 and as the overlap length 260 increases beyond the extent to cover the guided mode 20, the efficiency of modulation therefore does not increase significantly. Such behaviour may change when, for example, the EO modulator 200 is used for a waveguide where the guided mode 20 is less tightly confined.

The loss due to the EO modulator 200 was also evaluated with the simulation. The loss also follows a similar trend as the graph 280, namely that the loss decreases rapidly from 400 nm to 900 nm overlap length 260 but does not decrease significantly further from 900 nm overlap length 260. In this specific configuration and dimensions of the EO modulator 200 simulated under FIG. 2c, this may also be attributed to the fact that the guided mode 20 of the core 30 may be largely confined around the cross-section of the core 30 and as the overlap length 260 increases beyond the extent to cover the guided mode 20, the loss therefore does not increase significantly.

The capacitance of the EO modulator 200 was also evaluated with the simulation. The capacitance was minimised around the overlap length of 800 nm to be around 4500 fF, and increased rapidly and monotonically as the overlap length increased upto 2800 nm, to be around 12000 fF. The capacitance of the EO modulator at 400 nm overlap length was around 5500 fF. In this specific configuration and dimensions of the EO modulator 200 simulated under FIG. 2c, the decrease of capacitance with the change of the overlap length 260 from 400 nm to 800 nm can mainly be attributed to the decrease of the required length of the EO modulator 200, $L_\pi$. The rapid and monotonous increase of the capacitance with the change of the overlap length 260 from 800 nm may be attributed to the linear increase of the size of the capacitor.

The design of the EO modulator 200 may be determined also considering the capacitance because the bandwidth of operation of the EO modulator 200 depends highly on the capacitance. According to the simulation of the specific configuration and dimensions of the EO modulator 200 simulated under FIG. 2c, the capacitance is minimised around 800 nm overlap length 260.

Therefore, according to the graph 280, the balance between the depth of modulation, loss and the bandwidth of operation may be provided at the overlap length 260 of around 800 nm, which corresponds to the width of the core 30.

In some implementations, the lateral extent of the capacitor formed by the first semiconductor layer 210 and the second semiconductor layer 220 may be rendered comparable to the width of the core 30 to reduce loss.

Although not shown here as a graph, a simulation was performed to evaluate the effect of the second distance 250, the distance between the first semiconductor layer 210 and the second semiconductor layer 220. In this simulation, the thickness of the semiconductor layer 210 and the second semiconductor layer 220 were set at 20 nm and the overlap length was set to be 2 µm. When the second distance 250 was varied from 2 nm to 5 nm, $L_\pi$ varied from 140 µm to 260 µm, largely monotonically and loss varied from 3.25 dB to 3.5 dB, also largely monotonically. As expected, the simulation showed that the second distance 250 may be made as small as possible to reduce optical loss and to enhance the depth of modulation. The second distance 250 may be determined by the minimum thickness of the layer fabricated reliably and reproducibly during manufacturing.

The design may be initially targeted to achieve a phase shift of $\pi$ with 1 V applied to the EO modulator 200. Then the design parameters may be varied to optimise the operation of the EO modulator 200. For example, to reduce the optical loss arising from the EO modulator, the first distance 240 may be changed or the thickness of the first semiconductor layer 210 and/or the second semiconductor layer 220 may be changed. The resulting voltage required to achieve a phase shift of $\pi$ may range from 1.5 V to 3 V.

Figure 3:
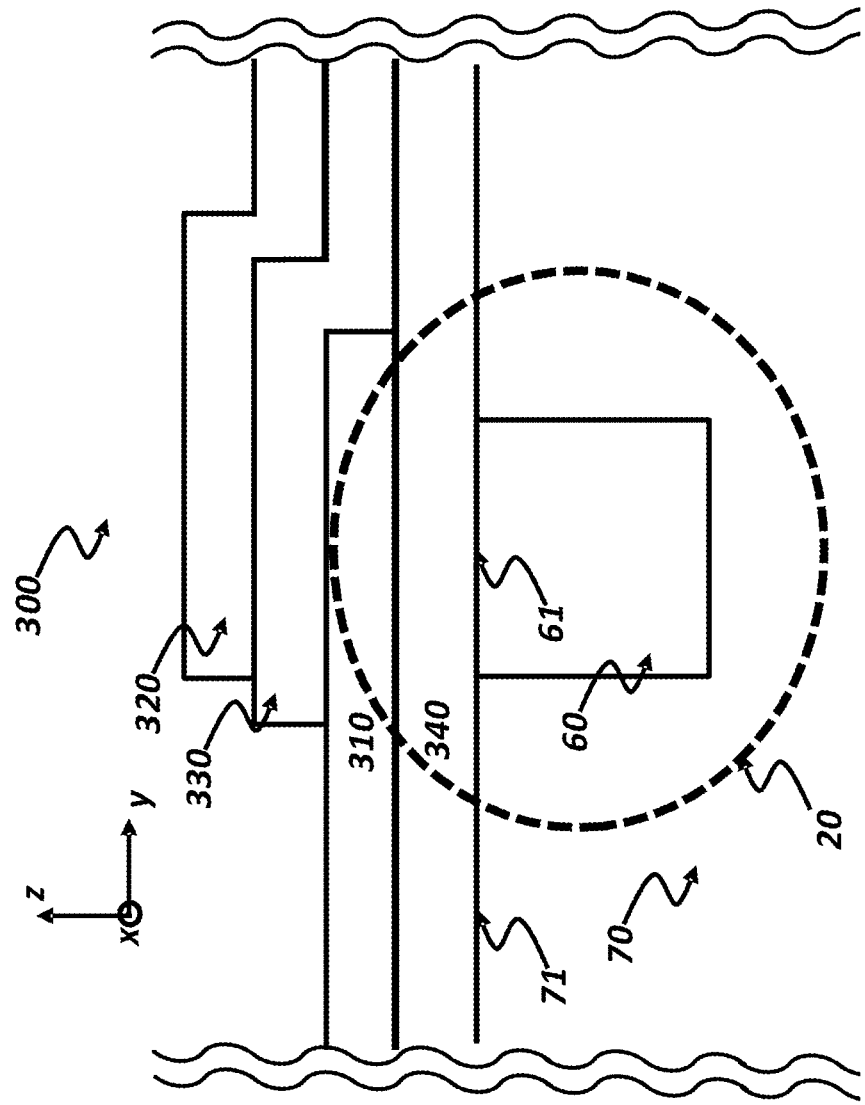
FIG. 3 is a schematic view of a cross-section of an electro-optic modulator on a waveguide.

FIG. 3 is a schematic that illustrates an exemplary embodiment of an electro-optic modulator with references to FIG. 1.

The electro-optic modulator 300, or EO modulator 300 is positioned in the vicinity of a waveguide including a core 60 embedded in a surrounding material 70. The refractive index of the surrounding material 70 is lower than the refractive index of the core 60. In particular, the EO modulator 300 is positioned such that amplitude modulation and/or phase modulation can be imparted on the guided mode 20 supported by the waveguide. As discussed above, the dotted line representing the transverse mode profile of the guided mode 20 is only a guide to the eye.

In the example of FIG. 3, the cross-section of the core 60 has a rectangular form and is positioned near an interface 71 formed by the end surface of the surrounding material 70. The core 60 is embedded in the surrounding material 70 such that three sides of the cross-section of the core 60 is embedded within and in contact with the surrounding material 70 and one of the sides of the cross-section of the core 60, a first side 61, is parallel to or flush with the interface 71 of the surrounding material 70. Therefore, the interface 71 formed by the surrounding material 70 and the first side 61 of the core 60 forms one planar surface in the x-y plane. The transverse profile of the guided mode 20 of the waveguide therefore may extend beyond the plane formed by the first side 61 and the interface 71 in the positive z-direction.

The thickness of the core 60, in z-direction, namely perpendicular to interface 71 and the first side 61, may be between 10 nm and 2.5 µm. The examples of the material of the core 60 are as discussed for the core 30 presented in the example of FIG. 2a. The core 60 can be deposited in the same fashion as the core 30 presented in the example of FIG. 2a.

The examples of the material of the surrounding material 70 are as discussed for the surrounding material 40 presented in the example of FIG. 2a.

A guided mode 20 travels in the x-direction, perpendicular to the cross section of the core 60, guided by the waveguide formed by the core 60 and a cladding formed within the surrounding material 70.

The EO modulator 300 includes a first semiconductor layer 310, a second semiconductor layer 320, an dielectric layer 330 and a coupling layer 340. The first semiconductor layer 310 is positioned closer to the core 60 than the second semiconductor layer 320. The dielectric layer 330 is disposed between the first semiconductor layer 310 and the second semiconductor layer 320. The coupling layer 340 is disposed between the core 60 and the first semiconductor layer 310. The coupling layer 340 is for coupling the guided mode 20 of the waveguide at least to the first semiconductor layer 310. The coupling layer 340 may be configured such that when the EO modulator 300 is coupled to the waveguide, the coupling layer 340 is disposed between the core 60 and the first semiconductor layer 310.

The first semiconductor layer 310 and the second semiconductor layer 320 can be deposited and treated as discussed for the first semiconductor layer 210 and the second semiconductor layer 220 in the example of FIG. 2a.

The material composition, the doping, the thickness of the first semiconductor layer 310 and the second semiconductor layer 320 are as discussed for the first semiconductor layer 210 and the second semiconductor layer 220 in the example of FIG. 2a.

The thickness of the coupling layer 340 in z-direction may be smaller than 500 nm.

In some implementations, the coupling layer 340 may comprise one or more of silicon dioxide ($SiO_2$), silicon oxynitride (SiON), aluminium oxide ($Al_2O_3$), or aluminium nitride (AlN).

In some implementations, the coupling layer 340 may be deposited using one or more of PECVD, LPCVD, atomic layer deposition (ALD) or by thermal oxidation of silicon or aluminium substrate, or by nitridation of silicon or aluminium substrate.

By controlling the thickness of the coupling layer 340, the position of the EO modulator 300 with respect to the guided mode 20 and with the core 60 may be determined. Therefore, the thickness of the coupling layer 340 is one of the parameters that relate to the optimum between the loss and the depth of modulation.

The thickness of the dielectric layer 330 in z-direction may be between 1 nm and 30 nm.

In some implementations, the dielectric layer 330 may comprise one or more of silicon dioxide ($SiO_2$), silicon oxynitride (SiON).

In some implementations, the dielectric layer 330 may be deposited by oxidation of silicon substrate or by atomic layer deposition (ALD).

In some implementations, the dielectric layer 330 and/or the coupling layer 340 may comprise one or more of Benzocyclobutene (BCB), poly methyl methacrylate (PMMA) or parylene, in case the waveguide and the EO modulator 300 can be fabricated within below 350° C.

The first semiconductor layer 310 and the second semiconductor layer 320 are respectively connected to electrical contacts as described in the example of FIG. 2a.

The material examples for the first semiconductor layer 310 and the second semiconductor layer 320 are as discussed in the example of FIG. 2a. In the example of FIG. 3, the first semiconductor layer 310 is deposited on the coupling layer 340 such that the first semiconductor layer 310 covers the first side 61 of the core 60 viewed down on the xy-plane. As discussed hereinbefore in FIG. 2c, the degree to which the first semiconductor layer 310 covers the first side 61 of the core 60 relates to the overlap length 260 and the overlap length 260 may be determined depending on how tightly confined the guided mode 20 is. In some implementations, the first semiconductor layer 310 may be deposited to fully cover the core 60. In some implementations, the first semiconductor layer 310 may be deposited to partially cover the core 60. Similar concept applies to the second semiconductor layer 320 and the dielectric layer 330.

For example, if the guided mode 20 supported by the waveguide formed with the core 60 and the cladding formed within the surrounding material 70 is only loosely confined because the refractive index difference between the core 60 and the surrounding material 70 is small, the semiconductor layer 310 may be deposited such that it fully covers the first side 61 of the core 60 and further beyond the core 60 in positive y-direction such that the EO modulator 300 interacts efficiently with the guided mode 20.

For another example, if the guided mode 20 supported by the waveguide formed with the core 60 and the cladding formed within the surrounding material 70 is tightly confined because the refractive index difference between the core 60 and the surrounding material 70 is large such as in the case of silicon nitride as a core and silicon dioxide as a cladding, the first semiconductor layer 310 may be deposited such that the semiconductor layer 310 terminates around the area defined by the first side 61, as shown in FIG. 3 and as suggested by the simulation result of FIG. 2C.

Starting from the area near the first side 61 of the core 60, the semiconductor layer 310 extends into the negative y-direction, in the transverse plane and parallel to the plane of the substrate, such that the electrical contacts can be formed on the semiconductor layer 310. The electrical contact may be positioned at least 1 μm from the center of the core 60.

The dielectric layer 330 is disposed on top of the first semiconductor layer 310 such that the dielectric layer 330 covers the core 60, viewed down on the xy-plane, with part of the first semiconductor layer 310 between the core 60 and the dielectric layer 330.

The dielectric layer 330 may be deposited to extend into the positive y-direction, in the transverse plane and parallel to the plane of the substrate, starting from the area near the core 60, in the opposite direction to the first semiconductor layer 310. The second semiconductor layer 320, starting from the area near the core 60, extends into positive y-direction such that electrical contact can be formed on the second semiconductor layer 320. The electrical contact may be positioned at least 1 μm from the center of the core 60.

The second semiconductor layer 320 can be deposited on the dielectric layer 330. The second semiconductor layer 320 may be deposited such that viewed down into xy-plane, the second semiconductor layer 320 covers the first side 61 of the core 60. As discussed hereinbefore, the degree to which the dielectric layer 330 covers the core may be determined depending on the waveguide formed by the core 60 and the surrounding material 70. In particular, the second semiconductor layer 320 may be deposited such that it does not extend beyond in the negative y-direction the position where the dielectric layer 330 terminates. Since the second semiconductor layer 320 forms a capacitor structure with the first semiconductor layer 310, the first semiconductor layer 310 and the second semiconductor layer 320 must not be in any electrical contact with each other.

Since the dielectric layer 330 is formed in two different heights in z-direction, namely on top of the semiconductor layer 310 near the first side 61 of the core 60 and on top of the coupling layer 340 away from the core 60 into the positive y-direction, the second semiconductor layer 320, deposited on top of the dielectric layer 330, largely follows the profile of the dielectric layer 330 and lies in two different heights in z-direction.

In the example of FIG. 3, the first semiconductor layer 310, the second semiconductor layer 320 are deposited to form a capacitor type structure with the dielectric layer 330 between them. The capacitor type structure wholly covers the lateral extent, in y-direction, of the core 60. The first semiconductor layer 310 and the second semiconductor layer 320 are arranged to overlap, when viewed down into the xy-plane, directly over the core 60 above the first side 61. This is such that the EO modulator 300 interacts with the guided mode 20 extending beyond the first side 61 of the core.

Figure 4A:
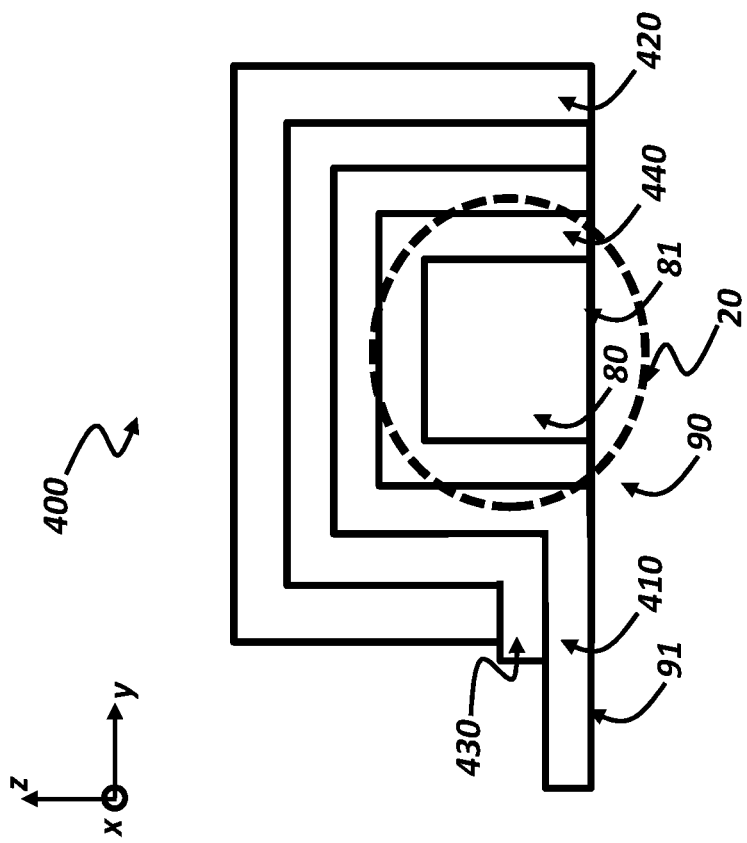
FIG. 4a is a schematic view of a cross-section of an electro-optic modulator on a waveguide.

FIG. 4a is a schematic that illustrates an exemplary embodiment of an electro-optic modulator with references to FIG. 1.

The electro-optic modulator 400, or EO modulator 400, is positioned in the vicinity of a waveguide including a core 80 in contact with a surrounding material 90. The refractive index of the surrounding material 90 is lower than the refractive index of the core 80. The EO modulator 400 is positioned such that amplitude modulation and/or phase modulation can be imparted on the guided mode 20 supported by the waveguide.

In the example of FIG. 4a, the cross-section of the core 80 has a rectangular form and is positioned near an interface 91 formed by the end surface of the surrounding material 90. The core 80 is fabricated such that one of the sides of the cross-section of the core 80, a first side 81, is parallel to or flush with the interface 91 of the surrounding material 90. Therefore, the interfaces formed by the surrounding material 90 and the first side 81 of the core 80 form one planar surface in the x-y plane.

In some implementations, in a region without the EO modulator 400, the core 80 and the surrounding material 90 may form a rib waveguide where the three sides of the cross-section of the core 80 which is not in contact with the surrounding material 90 may be exposed to air or vacuum.

Alternatively, in some implementations, in a region without the EO modulator 400, the core 80 may be embedded in the surrounding material 90 on all four sides of the cross-section of the core 80 such that the waveguide is formed with the surrounding material 90 as the cladding.

In both cases, the transverse profile of the guided mode 20 of the waveguide therefore may extend beyond the sides of the cross-section of the core 80.

The thickness of the core 80, in z-direction, namely perpendicular to the plane of the substrate on which the EO modulator 400 and the waveguide are deposited, may be between 10 nm and 2.5 μm. The examples of the material of the core 80 are as described for the core 10, 30, 60 in the examples of FIGS. 1, 2a and 3. The core 80 can be deposited in the same fashion as the core 30 presented in the example of FIG. 2a.

The examples of the material of the surrounding material 90 are as discussed for the surrounding material 130, 40, 70 presented in the example of FIGS. 1, 2a and 3. A guided mode 20 travels in the x-direction, perpendicular to the cross section of the core 80, guided by the waveguide formed by the core 80 and a cladding formed within the surrounding material 90.

The EO modulator 400 includes a first semiconductor layer 410, a second semiconductor layer 420, a dielectric layer 430 and a coupling layer 440. The first semiconductor layer 410 is positioned closer to the core 80 than the second semiconductor layer 420. The dielectric layer 430 is positioned between the first semiconductor layer 410 and the second semiconductor layer 420. The coupling layer 440 is positioned between the core 80 and the semiconductor layer 410. The coupling layer 440 is for coupling the guided mode 20 of the waveguide at least to the semiconductor layer 410. The coupling layer 440 may be configured such that when the EO modulator 400 is coupled to the waveguide, the coupling layer 440 is disposed between the core 80 and the silicon layer 410.

The first semiconductor layer 410 and the second semiconductor layer 420 can be deposited and treated as discussed for the first semiconductor layer 210, 310 and the second semiconductor layer 220, 320 in the examples of FIGS. 2a and 3.

The material composition, the doping, the thickness of the first semiconductor layer 410 and the second semiconductor layer 420 are as discussed for the semiconductor layer 210, 310 and the second semiconductor layer 220, 320 in the example of FIGS. 2a and 3.

The thickness of the coupling layer 440 in z-direction may be smaller than 500 nm.

The examples of the material composition of the coupling layer 440 are as discussed for the coupling layer 340 in the example of FIG. 3.

The coupling layer 440 can be deposited in the same fashion as the coupling layer 340 as discussed in the example of FIG. 3.

By controlling the thickness of the coupling layer 440, the position of the EO modulator 400 with respect to the guided mode 20 and with the core 80 may be determined. Therefore, the thickness of the coupling layer 440 is one of the parameters that relate to the optimum between the loss and the depth of modulation.

The thickness of the dielectric layer 430 in z-direction may be between 1 nm and 30 nm.

The examples of the material composition of the dielectric layer 430 are as discussed for the dielectric layer 330 in the example of FIG. 3.

The dielectric layer 430 may be deposited in the same fashion as the dielectric layer 330 in the example of FIG. 3.

The operating principle and configuration of the EO modulator 400, including the electrical contacts and a capacitor-like structure formed by the first semiconductor layer 410, the second semiconductor layer 420 and the dielectric layer 430, are as discussed for the EO modulator 300 in the example of FIG. 3.

In the example of FIG. 4a, the coupling layer 440 is deposited on the three sides of the cross-section of the core 80 which are not in contact with the surrounding material 90. The first semiconductor layer 410 is disposed on the coupling layer 440 such that the first semiconductor layer 410 covers the three sides of the cross-section of the core 80, largely following the profile of the coupling layer 440. In the case of EO modulator 200, 300 in FIGS. 2a and 3, the first semiconductor layer 210, 310 is parallel to the first side 31, 61 of the core 30, 60, covering the area around the first side 31, 61. In the example of FIG. 4, the first semiconductor layer 410 is deposited such that it covers the three sides of the cross-section of the core 80. This may provide more efficient modulation of the guided mode 20 compared to the EO modulators 200, 300 shown in FIGS. 2a and 3 where only one side of the cross-section of the core 30, 60 is covered with the semiconductor layer 210, 310. Also, the modulation is insensitive to the polarisation of the guided mode 20 within the waveguide. In contrast, in the example of FIG. 3, the guided mode 20 may be modulated when the guided mode 20 is a TE mode.

Starting from the area near the first side 81 of the core 80, the first semiconductor layer 410 extends into the negative y-direction such that the electrical contacts can be formed on the first semiconductor layer 410. The electrical contact may be positioned at least 1 μm from the center of the core 80.

The dielectric layer 430 is disposed on top of the first semiconductor layer 410. The profile of the dielectric layer 430 in yz-plane may follow the profile of the first semiconductor layer 410 in yz-plane.

In some implementations, the dielectric layer 430 may be deposited to extend into the positive y-direction starting from the area near the core 80.

The second semiconductor layer 420 can be subsequently deposited on the dielectric layer 430. The profile of the second semiconductor layer 420 in yz-plane may follow the profile of the dielectric layer 430 in yz-plane. In particular, the second semiconductor layer 420 may be deposited such that it does not extend beyond in the negative y-direction the position where the dielectric layer 430 terminates. Since the second semiconductor layer 420 forms a capacitor structure with the first semiconductor layer 410, the first semiconductor layer 410 and the second semiconductor layer 420 must not be in any electrical contact with each other. The extent to which the dielectric layer 430 covers the core 80 may be determined also in view of this aspect.

In some implementations, the second semiconductor layer 420, starting from the area near the core 80, may extend into positive y-direction such that electrical contact can be formed on the second semiconductor layer 420. The electrical contact may be positioned at least 1 μm from the core 80.

In the example of FIG. 4a, the first semiconductor layer 410, the second semiconductor layer 420 are deposited to form a capacitor type structure with the dielectric layer 430 between them. The capacitor type structure wholly covers the three sides of the cross-section of the core 80 in yz-plane. This is such that the EO modulator 400 interacts with the guided mode 20 extending beyond the three sides of the cross-section of the core.

Figure 4B:
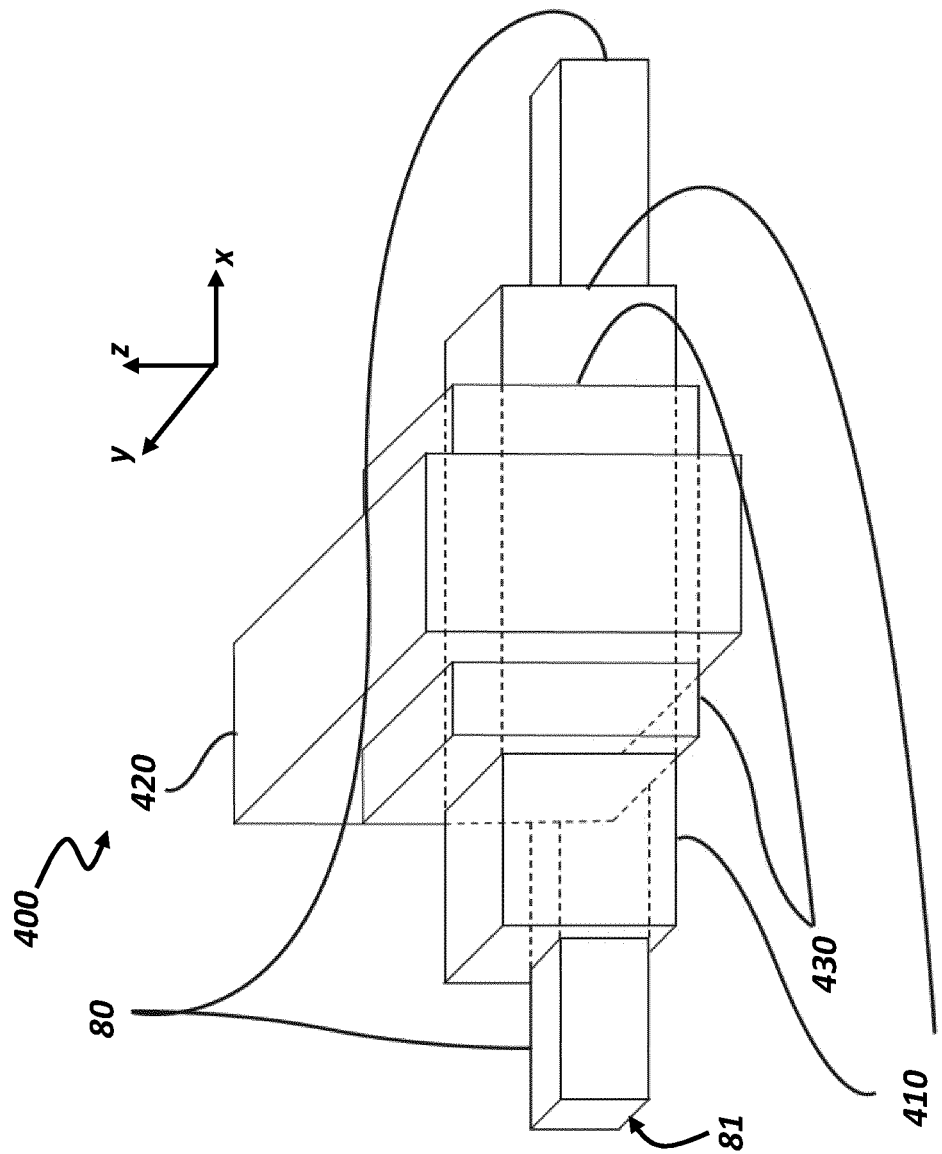
FIG. 4b is a schematic 3-dimensional view of an electro-optic modulator on a waveguide.

FIG. 4b is a schematic that illustrates an exemplary embodiment of an electro-optic modulator with references to FIG. 4a.

FIG. 4b shows the EO modulator 400 disposed on the waveguide including the core 80. In particular, FIG. 4b shows the extent of the EO modulator 400 in x-direction, perpendicular to the cross section of the core 80 which is also the direction of the propagation of the guided wave 20.

The surrounding material 90 in xy-plane under the first surface 81 of the core 80 as discussed in FIG. 4a.

In some implementations, the waveguide including the core 80 may be a rib waveguide such that the core 80 is only in contact with the planar surface of the surrounding material 90 in xy-plane. The core 80 may be exposed to vacuum or air where EO modulator 400 is not present.

In some implementations, the waveguide and the EO modulator 400 are embedded in the surrounding material 90. This arrangement can be achieved by depositing the surrounding material 90 after depositing EO modulator 400 such that neither the core 80 nor the EO modulator 400 are exposed to air or vacuum.

In some implementations, the coupling layer 440 may be deposited on the core 80, on three sides which are not in contact with the surrounding material 90 throughout the core 80. Therefore, the outermost surfaces of the core 80 exposed to air or vacuum may comprise the coupling layer 440.

In some implementations, the coupling layer 440 may be deposited on the core 80 only where the first semiconductor layer 410 is present in between the core 80 and the first semiconductor layer 410.

In some implementations, the extent or in x-direction or the length of the first semiconductor layer 410, the dielectric layer 430, and the second semiconductor layer 420 are such that the first semiconductor layer 410 is the longest and the second semiconductor layer 420 is the shortest. This is to ensure that the first semiconductor layer 410 and the second semiconductor layer 420 may not be accidentally electrically shorted during fabrication. The efficiency of modulation or modulation depth, or $L\pi$ may be dependent on the extent of the second semiconductor layer 420 in x-direction.

Although the example of FIGS. 4*a* and 4*b* relate to the EO modulator 400 covering three sides of the core 80, this concept can be extended to covering four sides or all of the sides of the core 30, 60, 80 forming the waveguide to increase efficiency of modulation.

Figure 5A:
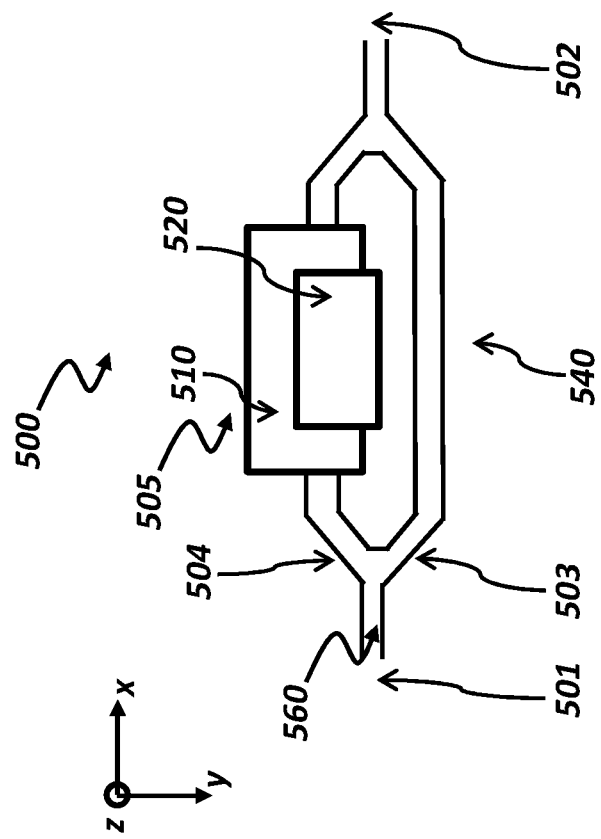
FIGS. 5a and 5b are a schematic that illustrates an exemplary embodiment of a Mach-Zehnder modulator.

FIG. 5*a* is a schematic that illustrates an exemplary embodiment of a Mach-Zehnder modulator.

FIG. 5*a* shows a top view of the Mach-Zehnder modulator, or MZ modulator 500. The MZ modulator 500 includes a photonic Mach-Zehnder interferometer on which an EO modulator 505 is disposed.

The EO modulator 505 may be one of the examples of the EO modulator 100, 200, 300, 400 described in FIGS. 1, 2*a*, 3, 4*a* and 4*b*.

The MZ modulator 500 includes a waveguide formed with a core 560 and a cladding formed within the surrounding material, which is not visible in FIG. 5*a*. The waveguide in the example of FIG. 5*a* is as described in FIGS. 1, 2*a*, 3, 4*a* and 4*b* hereinbefore. For example, as shown in FIG. 3, the cross-section of the core 60, 560 in yz-plane is in a rectangular shape and three sides of the cross-section of the core is embedded in the surrounding material 70, 540.

The MZ modulator 500 includes an input port 501 and an output port 502. In some implementations, the input port 501 and the output port 502 may be connected to other components in the same substrate via the same type of waveguide including the core 560. In some implementations, the input port 501 and the output port 502 may be configured such that other components can be connected to the MZ modulator 500. As long as the guided mode 20 can be interfaced via the input port 501 and the output port 502, the implementation of the input port 501 and the output port 502 is not limited to these examples.

To form a Mach-Zehnder interferometer, between the input port 501 and the output port 502, the waveguide splits into a first arm 503 and a second arm 504. The guided mode 20 input in the input port 501 may be split into the first arm 503 and the second arm 504 such that the guided mode 20 launches into the first arm 503 and the second arm 504 with substantially equal power. In some implementations, the splitting of the optical mode may be achieved via a multi-mode interference (MMI) device.

In one of the arms, in this example in the second arm 504, the EO modulator 505 is integrated into the MZ modulator 500. The EO modulator 505 is deposited on the waveguide forming the first arm 504, for example, as described in FIG. 3.

The coupling layer 540 is deposited above the core 560 and the surrounding material around that part of the core 560. The first semiconductor layer 510 is deposited on the coupling layer 540. The dielectric layer, also not visible in FIG. 5*a*, is deposited on the first semiconductor layer 510. The second semiconductor layer 520 is deposited on the oxide layer to form the EO modulator 505, for example, the EO modulator 300 described in FIG. 3. The coupling layer 540 is for coupling the guided mode 20 of the waveguide at least to the first semiconductor layer 510. The coupling layer 540 may be configured such that when the EO modulator 500 is coupled to the waveguide, the coupling layer 540 is disposed between the core 560 and the semiconductor layer 510.

In some implementations, the length of the second arm 504 in x-direction is arranged to be comparable to or longer than $L\pi$ of the EO modulator 505. By applying a voltage within the possible operating voltage range of the EO modulator 505, the guided mode 20 travelling in the second arm 504 can acquire $\pi$ phase shift when $V\pi$ is applied to the EO modulator. Since the guided mode 20 which entered in the first arm 503 did not acquire any additional phase shift, when the guided modes 20 in the first arm 503 and the second arm 504 recombine, a destructive interference may occur at the output port 502 when $V\pi$ is applied to the EO modulator 505. This provides amplitude modulation of the guided mode 20.

Figure 5B:
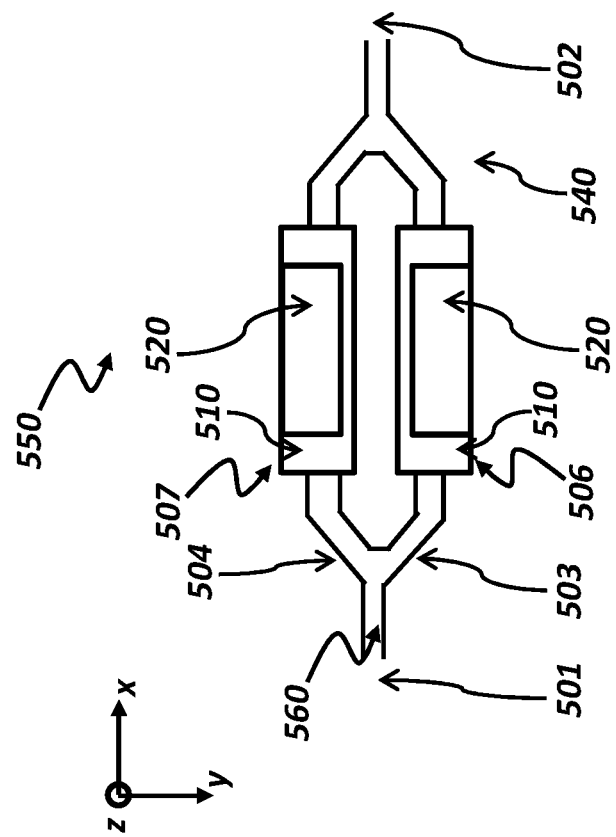

FIG. 5*b* is a schematic that illustrates an exemplary embodiment of a Mach-Zehnder modulator.

FIG. 5*b* shows a top view of the Mach-Zehnder modulator 550 or MZ modulator. The description of the MZ modulator 500 of FIG. 5*a* applies also to the amplitude modulator 550 in that it includes a photonic Mach-Zehnder interferometer embedding the EO modulator 100, 200, 300, 400 described in FIGS. 1, 2*a*, 3, 4*a* and 4*b*, except that the amplitude modulator 550 in this example includes two EO modulators, a first EO modulator 506 and a second EO modulator 507, in the first arm 530 and the second arm 504, respectively.

In some implementations, the two EO modulators 506, 507 may operate in a push-pull configuration. The first EO modulator 506 and the second EO modulator 507 may be driven with the same voltage source or driven with two voltage source which are phase-locked with each other such that the phase shift with the same amplitude but with an opposite sign are generated in the first EO modulator 506 and the second EO modulator 507. The length of the arms 503, 504 can be half the length of the MZ modulator 500 of FIG. 5*a* in case $\pi$ phase shift is required for amplitude modulation. Due to shorter lengths of the first arm 503 and the second arm 504, the overall loss may be reduced.

Figure 6:
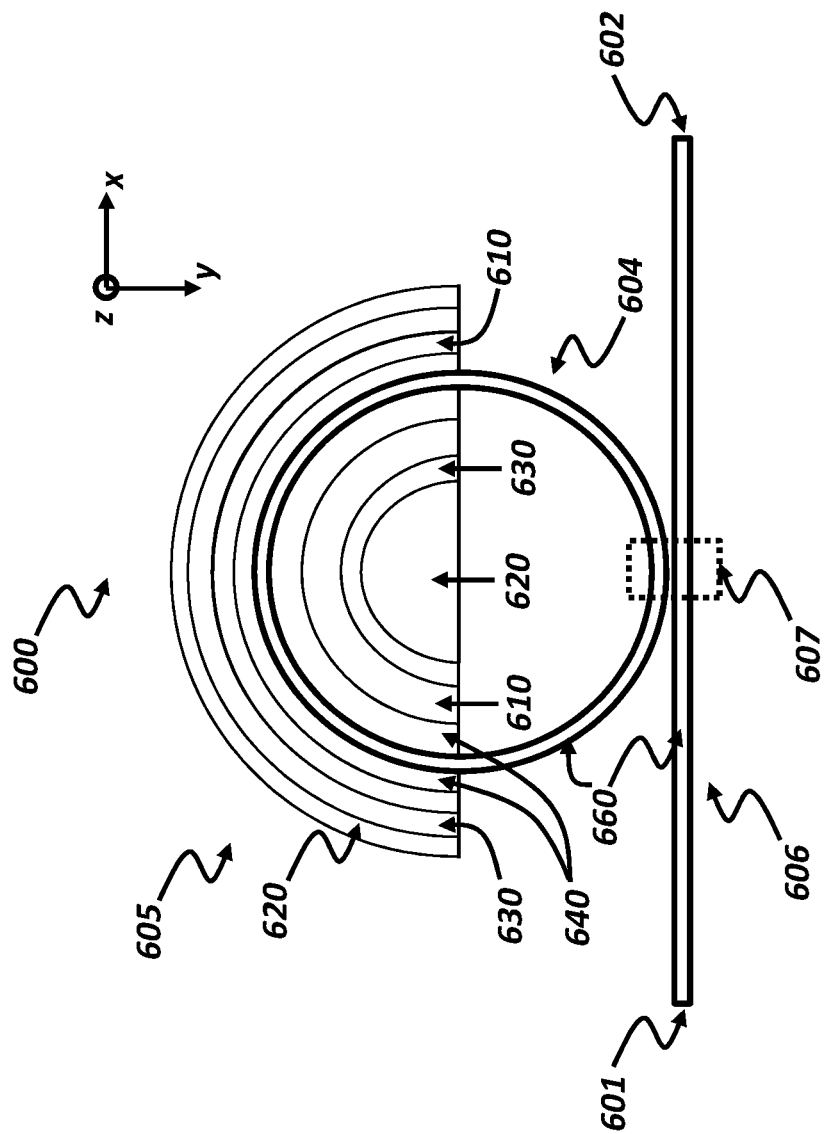
FIG. 6 is a schematic top view of a ring resonator modulator.

FIG. 6 is a schematic that illustrates an exemplary embodiment of a ring resonator modulator.

FIG. 6 shows a top view of the ring resonator modulator 600. The ring resonator modulator 600 includes a ring resonator 604 on which an EO modulator 605 is disposed and a bus waveguide 606. For example, the EO modulator 605 may be the EO modulator 400 described in FIGS. 4*a* and 4*b*. However, the configuration of the EO modulator 605 is not limited to the example of the FIGS. 5*a* and 5*b*. Any one of the EO modulators 100, 200, 300, 400 described in the earlier examples may be applied to the ring resonator modulator 600.

The ring resonator 604 and the bus waveguide 606 include a waveguide formed with a core 660 and a cladding formed within the surrounding material which is not visible in FIG. 6. For example, the waveguide is as described in FIG. 4*a* hereinbefore: the cross-section of the core 80 in yz-plane is in a rectangular shape and at least one side of the cross-section of the core is in contact with the surrounding material 90. However, the ring resonator modulator 600 can also be constructed with any geometry of the waveguide described in earlier examples.

The ring resonator 604 and the bus waveguide 606 are coupled to each other at a coupling region 607, which is demarcated with a dotted line in FIG. 6. In some implementations, the ring resonator 604 and the bus waveguide 606 may be coupled to each other by being in proximity such that the guided mode 20 are evanescently coupled. In this case, the distance between the ring resonator 604 and the bus waveguide 606 may be one of the parameters that determine the degree of coupling between the ring resonator 604 and the bus waveguide 606.

The EO modulator 605 may be disposed on the waveguide forming the ring resonator 604. The EO modulator 605 may partially overlap the circumference of the ring resonator 604. FIG. 6 shows that the EO modulator 605 covers approximately half 20) of the circumference. However, the extent to which the EO modulator 605 covers the ring resonator 604 is not limited to this example. For example, the EO modulators 605 may cover almost the entire circumference except the coupling area.

In some embodiments, the EO modulator 605 may cover the coupling area 607 in addition to all or part of the circumference of the ring resonator 604.

The coupling layer 640 is deposited above the core 660 and the surrounding material around that part of the core 660. The first semiconductor layer 610 is deposited on the coupling layer 640. The dielectric layer 630 is deposited on the first semiconductor layer 610. The second semiconductor layer 620 is deposited on the dielectric layer 630 to form the EO modulator 605.

The ring resonator modulator 600 includes an input port 601 and an output port 602 on each side of the bus waveguide 606. In some implementation, the input port 601 and the output port 602 may be connected to other components in the same substrate via the same type of waveguide including the core 660. In some implementations, the input port 601 and the output port 602 may be connectorised such that other components can be connected to the ring resonator modulator 600. As long as the guided mode 20 can be interfaced via the input port 601 and the output port 602, the implementation of the input port 601 and the output port 602 is not limited to these examples.

In response to an electric field or voltage applied to the EO modulator 605, the EO modulator 605 can introduce phase shift to the guided mode 20 travelling in the ring resonator 604, thereby shifting the resonance of the ring resonator 604. This leads to the frequency shift of transmission spectrum between the input port 601 and the output port 602.

Figure 7:
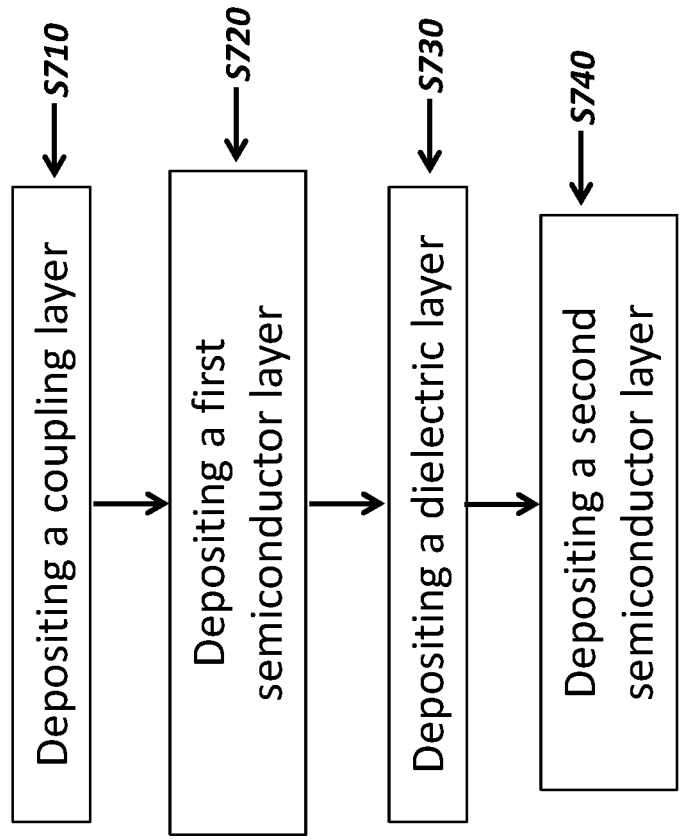
FIG. 7 is a flowchart that illustrates an exemplary method of fabricating an electro-optic modulator.

FIG. 7 is a flowchart that illustrates an exemplary method of fabricating an electro-optic modulator.

In particular, FIG. 7 shows a method of forming an EO modulator 100, 200, 300, 400, 505, 506, 507, 605 on a waveguide formed including a core 10, 30, 60, 80, 560, 660.

At step 710, a coupling layer 340, 440, 540, 640 may be deposited on the waveguide. In some implementations, the coupling layer 340, 440, 540, 640 may be deposited such that the coupling layer 340, 440, 540, 640 is directly in contact with at least one surface of the core 10, 30, 60, 80, 560, 660. The examples of the deposition methods of the coupling layer 340, 440, 540, 640 are described in the earlier examples.

At step 720, a first semiconductor layer 210, 310, 410, 510, 610 may be deposited on the coupling layer 340, 440, 540, 640. The examples of the deposition methods of the first semiconductor layer 310, 410, 510, 610 are described in the earlier examples.

At step 730, an dielectric layer 230, 330, 430, 630, may be deposited on the first semiconductor layer 210, 310, 410, 510, 610. The examples of the deposition methods of the dielectric layer 230, 330, 430, 630 are described in the earlier examples.

At step 740, a second semiconductor layer 220, 320, 420, 520, 620 may be deposited on the dielectric layer 230, 330, 430, 630. The examples of the deposition methods of the second semiconductor layer 220, 320, 420, 520, 620 are described in the earlier examples.

The embodiments of the invention shown in the drawings and described hereinbefore are exemplary embodiments only and are not intended to limit the scope of the invention, which is defined by the claims hereafter. It is intended that any combination of non-mutually exclusive features described herein are within the scope of the present invention.

The invention claimed is:

1. An electro-optic modulator for a waveguide, comprising:
   a first semiconductor layer;
   a second semiconductor layer;
   a dielectric layer interposed between the second semiconductor layer and the first semiconductor layer; and
   a coupling layer for coupling a guided mode of the waveguide to at least one of the first semiconductor layer and the second semiconductor layer,
   wherein the coupling layer is disposed between the first semiconductor layer and the waveguide such that a centre of the guided mode does not overlap with the electro-optic modulator, and
   wherein the electro-optic modulator is configured to induce a modulation on the guided mode of the waveguide by changing a refractive index in response to a voltage applied between the first semiconductor layer and the second semiconductor layer.

2. The electro-optic modulator of claim 1, wherein the first semiconductor layer and the second semiconductor layer comprise opposite types of doping to each other such that when the first semiconductor layer exhibits an n-type behaviour, the second semiconductor layer exhibits a p-type behaviour and when the first semiconductor layer exhibits a p-type behaviour, the second semiconductor layer exhibits an n-type behaviour.

3. The electro-optic modulator of claim 2, wherein at least one of the first semiconductor layer and the second semiconductor layer comprise a non-degenerate semiconductor.

4. The electro-optic modulator of claim 2, wherein at least one of the first semiconductor layer and the second semiconductor layer comprise a III-V semiconductor.

5. The electro-optic modulator of claim 2, wherein at least one of the first semiconductor layer and the second semiconductor layer comprise one or more of silicon, germanium and SiGe alloys.

6. The electro-optic modulator of claim 2, wherein a structure of at least one of the first semiconductor layer and the second semiconductor layer is one of the following:
   amorphous, hydrogenated amorphous, polycrystalline, nanocrystalline or crystalline.

7. The electro-optic modulator of claim 2, wherein at least one of the first semiconductor layer and the second semiconductor layer comprise an alloy including one or more of NiSi, Ni2Si, NiSi2, TiSi, TiSi2, CoSi, Co2Si, PtSi or germanide thin films.

8. The electro-optic modulator of claim 1, wherein at least one of the first semiconductor layer and the second semiconductor layer comprise an intrinsic semiconductor.

9. The electro-optic modulator of claim 1, wherein at least one of the first semiconductor layer and the second semiconductor layer comprise a semi-metallic layer.

10. The electro-optic modulator of claim 1, wherein a thickness of the dielectric layer is between 0.1 nm and 40 nm.

11. The electro-optic modulator of claim 1, wherein a thickness of the first semiconductor layer and the second semiconductor layer is less than 500 nm.

12. The electro-optic modulator of claim 1, wherein the coupling layer comprises one or more of silicon dioxide ($SiO_2$), silicon oxynitride (SiON), aluminium oxide ($Al_2O_3$), aluminium nitride (AlN), Benzocyclobutene (BCB), poly methyl methacrylate (PMMA) or Parylene.

13. The electro-optic modulator of claim 1, wherein the dielectric layer comprises one or more of silicon dioxide ($SiO_2$), silicon oxynitride (SiON), Benzocyclobutene (BCB), poly methyl methacrylate (PMMA) or Parylene.

14. A device comprising:
a waveguide including a core; and
the electro-optic modulator according to claim 1,
wherein a cross-section of the core is of a polygonal shape at at least one position along the propagation direction of the guided mode, and
wherein at the at least one position, the electro-optic modulator is formed to be substantially parallel to and to cover a side of the cross-section of the core.

15. The device of claim 14, wherein at the at least one position, the electro-optic modulator is formed to be substantially parallel to and to cover two or more consecutive sides of the cross-section of the core.

16. The device of claim 14,
wherein an extent of the first semiconductor layer along the propagation direction of the guided mode is larger than an extent of the dielectric layer along the same direction, and
wherein the extent of the dielectric layer along the propagation direction of the guided mode is larger than an extent of the second semiconductor layer in the same direction.

17. A Mach-Zehnder modulator comprising:
an input port;
an output port;
a first splitter and a second splitter connected respectively to the input port and the output port and configured to split a guided mode of light received respectively from the input port and the output port into two guided modes of light; and
a first arm and a second arm disposed between and connecting the first splitter and the second splitter such that a Mach-Zehnder interferometer is formed,
wherein the first arm comprises a waveguide and a first electro-optic modulator, being the electro-optic modulator of claim 1.

18. The Mach-Zehnder modulator of claim 17, wherein the second arm comprises a waveguide and a second electro-optic modulator, being the electro-optic modulator of claim 1.

19. A ring resonator comprising:
a bus waveguide comprising an input port and an output port;
a ring resonator coupled to the bus waveguide,
wherein the ring resonator comprises a waveguide and the electro-optic modulator of claim 1.

20. A method of fabricating an electro-optic modulator on a waveguide, the method comprising:
depositing a coupling layer on the waveguide such that a centre of a guided mode of the waveguide does not overlap with the electro-optic modulator;
depositing a first semiconductor layer on the coupling layer;
depositing a dielectric layer on the first semiconductor layer; and
depositing a second semiconductor layer on the dielectric layer.

21. The method of claim 20, wherein the depositing the coupling layer comprises one or more of PECVD, LPCVD, atomic layer deposition (ALD), thermal oxidation.

22. The method of claim 20, wherein the depositing the first semiconductor layer comprises LPCVD, PECVD, ALD, sputtering or PVD and said first semiconductor layer has a doping level less than $2 \times 10^{20}$ at/$cm^3$, or
wherein the depositing the second semiconductor layer comprises LPCVD, PECVD, ALD, sputtering or PVD and said second semiconductor layer has a doping level less than $2 \times 10^{20}$ at/$cm^3$.

23. The method of claim 20, wherein the depositing the dielectric layer comprises oxidation of the first semiconductor layer or one or more of atomic layer deposition (ALD), thermal oxidation or nitridation.

* * * * *